(12) United States Patent
Becerra et al.

(10) Patent No.: US 7,255,947 B2
(45) Date of Patent: Aug. 14, 2007

(54) FUEL SUBSTANCE AND ASSOCIATED CARTRIDGE FOR FUEL CELL

(75) Inventors: Juan J. Becerra, Altamont, NY (US); Frank W. Kovacs, Waterford, NY (US); Xiaoming Ren, Menands, NY (US)

(73) Assignee: The Gillette Company, Boston, MA (US)

( * ) Notice: Subject to any disclaimer, the term of this patent is extended or adjusted under 35 U.S.C. 154(b) by 502 days.

(21) Appl. No.: 10/688,433

(22) Filed: Oct. 17, 2003

(65) Prior Publication Data

US 2005/0084720 A1 Apr. 21, 2005

(51) Int. Cl.
*H01M 8/04* (2006.01)
*C10L 7/04* (2006.01)

(52) U.S. Cl. .............. 429/13; 429/34; 44/266
(58) Field of Classification Search .......... 429/13, 429/17, 19, 20, 34; 44/266, 267
See application file for complete search history.

(56) References Cited

U.S. PATENT DOCUMENTS

| | | | |
|---|---|---|---|
| 5,723,229 | A | 3/1998 | Scheifers et al. |
| 5,744,694 | A * | 4/1998 | Berte et al. ............. 44/266 |
| 5,773,706 | A * | 6/1998 | Wesley et al. ........... 44/266 |
| 5,904,740 | A | 5/1999 | Davis |
| 6,268,077 | B1 | 7/2001 | Kelley et al. |
| 6,326,097 | B1 | 12/2001 | Hockaday |
| 6,506,513 | B1 | 1/2003 | Yonetsu et al. |
| 2003/0162070 | A1 | 8/2003 | Hirsch et al. |
| 2004/0076861 | A1* | 4/2004 | Mann et al. .............. 429/13 X |

FOREIGN PATENT DOCUMENTS

| | | | |
|---|---|---|---|
| EP | 0 580 246 A1 | | 1/1994 |
| EP | 1 462 460 A1 | | 9/2004 |
| JP | 02-234358 | * | 9/1990 |
| JP | 2002234358 | | 9/1990 |

(Continued)

OTHER PUBLICATIONS

Material Safety Data Sheet, The Sterno Group, Division of Candle Corporation of America, MSDS#0001, Revised Date: May 31, 2002, Product Name: Sterno Brand Canned Heat Cooking Fuel, pp. 1-5.

(Continued)

*Primary Examiner*—Stephen J. Kalafut
(74) *Attorney, Agent, or Firm*—Cesari & McKenna, LLP

(57) ABSTRACT

The present invention provides a gel fuel, which includes a fuel substance held in a polymeric structure. One embodiment of the composition includes neat methanol, to which a thickening substance, such as that sold commercially under the trade name Carbopol®, is added to impart viscosity, as well as stabilizing and suspending properties. In addition to the thickening substance, a further substance can be added to balance the pH of the gel fuel when needed. In accordance with the invention, a fuel cell cartridge is provided that has at least one aspect that is methanol-permeable, and which may include a fuel vapor permeable layer and it may be comprised of one of a number of various alternative materials. Features within the fuel cartridge can be used to increase surface area of the gel fuel, and to maintain the gel fuel in a desired location within the cartridge.

18 Claims, 18 Drawing Sheets

FOREIGN PATENT DOCUMENTS

| | | |
|---|---|---|
| JP | 2001093558 | 4/2001 |
| WO | WO 00/57745 | 10/2000 |
| WO | WO 01/75999 A1 | 10/2001 |
| WO | WO 03/057745 A1 | 7/2003 |
| WO | WO 2004/093229 A2 | 10/2004 |

OTHER PUBLICATIONS

U.S. Appl. No. 10/413,983, filed Apr. 15, 2004 by Xiaoming Ren et al. for Direct Oxidation Fuel Cell Operating With Direct Feed of Concentrated Fuel Under Passive Water Management.

U.S. Appl. No. 10/454,211, filed Jun. 4, 2003 by Xiaoming Ren et al. for Passive Water Management Techniques in Direct Methanol Fuel Cells.

U.S. Appl. No. 10/688,711, filed Oct. 17, 2003 by Xiaoming Ren et al. for Fuel Composition in Fuel Cartridges for DMPCS.

U.S. Appl. No. 10/413,986, filed Apr. 15, 2003 by Robert S. Hirsch et al. for Vapor Feed Fuel Cell System With Controllable Fuel Delivery.

U.S. Appl. No. 10/413,982, filed Apr. 15, 2003 by Juan J. Becerra et al. for Apparatus for Refueling a Direct Oxidation Fuel Cell.

U.S. Appl. No. 10/607,699, filed Jun. 27, 2003 by Alan J. Soucy for Methods of Providing Refueling for Fuel Cell-Powered Devices.

"Methanol Solid Fuel Gel/Fire Starter," Solutions Close to Home, NOVEON, Inc., 2001, 1 page, XP-002315679, Cleveland, Ohio.

"Carbopol® EZ-3 Polymer: A Versatile, High Efficiency, Self-Wetting Rheology Modifier for Household and I&I Applications," Products for Household and I&I, Noveon, Inc., Mar. 2003, 2 pages, XP-002315680, Cleveland, Ohio.

The Sterno Group, Material Safety Data Sheet, MSDS #0001, Revised May 31, 2002, Sterno Brand Canned heat Cooking Fuel, pp. 1-5.

\* cited by examiner

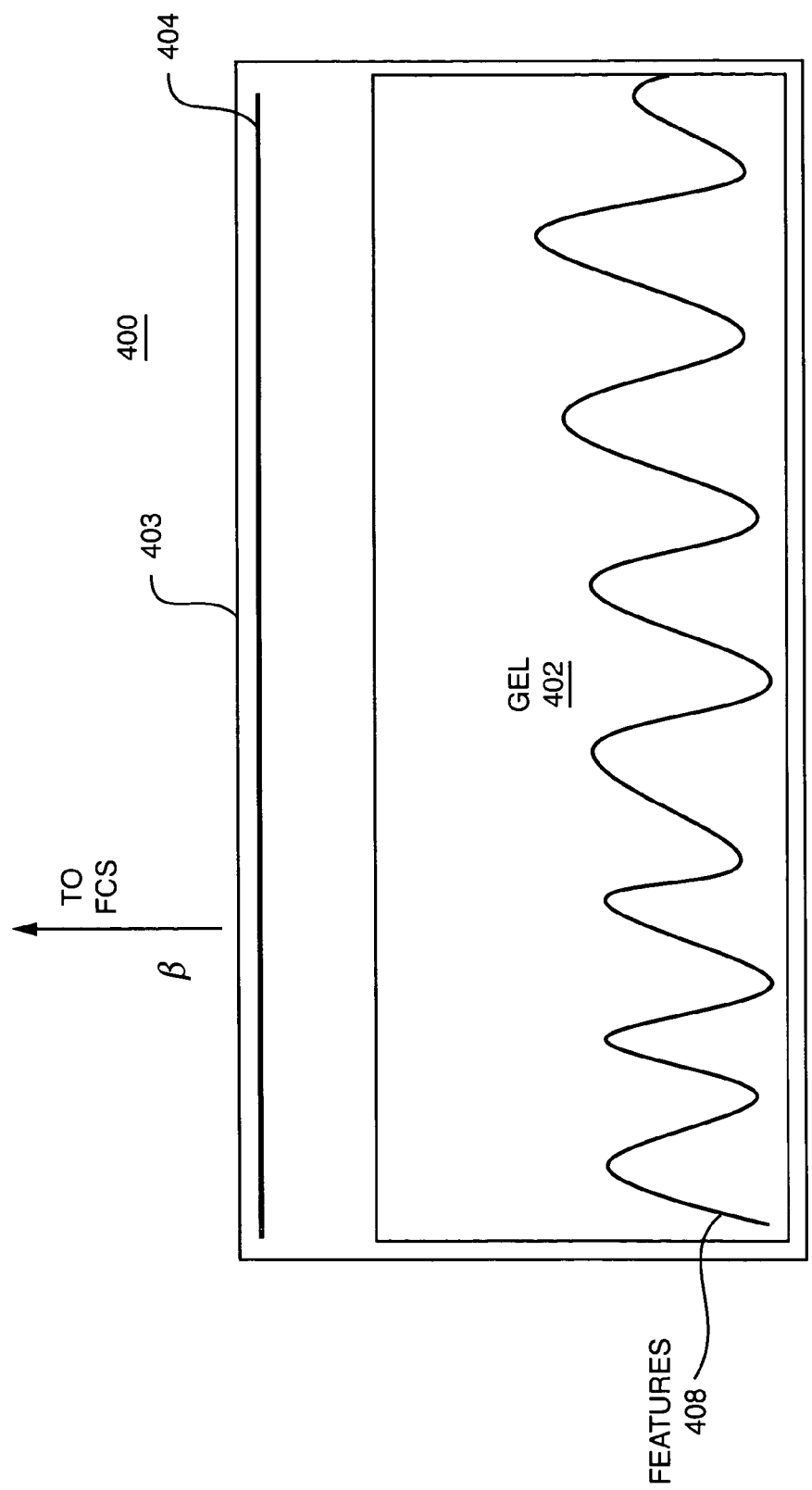

FUEL SUBSTANCE AND ASSOCIATED CARTRIDGE FOR FUEL CELL

BACKGROUND OF THE INVENTION

1. Field of the Invention

This invention relates generally to direct oxidation fuel cells, and more particularly, to fuel substances and cartridges for use in supplying fuel substances to such fuel cells.

2. Background Information

Fuel cells are devices in which electrochemical reactions are used to generate electricity. A variety of materials may be suited for use as a fuel depending upon the materials chosen for the components of the cell. Organic materials, such as methanol or natural gas, are attractive fuel choices due to the their high specific energy.

Fuel cell systems may be divided into "reformer-based" systems (i.e., those in which the fuel is processed in some fashion to extract hydrogen from the fuel before it is introduced into the fuel cell system) or "direct oxidation" systems in which the fuel is fed directly into the cell without the need for separate internal or external processing. Most currently available fuel cells are reformer-based fuel cell systems. However, because fuel processing is expensive and generally requires expensive components, which occupy significant volume, reformer-based systems are presently limited to comparatively large, high power applications.

Direct oxidation fuel cell systems may be better suited for a number of applications in smaller mobile devices (e.g., mobile phones, handheld and laptop computers), as well as in some larger applications. In direct oxidation fuel cells of interest here, a carbonaceous liquid fuel (typically methanol or an aqueous methanol solution) is introduced to the anode face of a membrane electrode assembly (MEA).

One example of a direct oxidation fuel cell system is a direct methanol fuel cell system or DMFC system. In a DMFC system, a mixture comprised of predominantly ethanol or methanol and water is used as fuel (the "fuel mixture"), and oxygen, preferably from ambient air, is used as the oxidizing agent. The fundamental reactions are the anodic oxidation of the fuel mixture into $CO_2$, protons, and electrons; and the cathodic combination of protons, electrons and oxygen into water. The overall reaction may be limited by the failure of either of these reactions to proceed to completion at an acceptable rate, as is discussed further hereinafter.

Typical DMFC systems include a fuel source, fluid and effluent management systems, and air management systems, as well as a direct methanol fuel cell ("fuel cell"). The fuel cell typically consists of a housing, hardware for current collection, fuel and air distribution, and a membrane electrode assembly ("MEA") disposed within the housing.

The electricity generating reactions and the current collection in a direct oxidation fuel cell system generally take place within the MEA. In the fuel oxidation process at the anode, the products are protons, electrons and carbon dioxide. Protons (from hydrogen found in the fuel and water molecules involved in the anodic reaction) are separated from the electrons. The protons migrate through the membrane electrolyte, which is non-conductive to the electrons. The electrons travel through an external circuit, which connects the load, and are united with the protons and oxygen molecules in the cathodic reaction, thus providing electrical power from the fuel cell.

A typical MEA includes an anode catalyst layer and a cathode catalyst layer sandwiching a centrally disposed protonically-conductive, electronically non-conductive membrane ("PCM", sometimes also referred to herein as "the catalyzed membrane"). One example of a commercially available PCM is NAFION® (NAFION® a registered trademark of E.I. Dupont de Nemours and Company), a cation exchange membrane based on polyperflourosulfonic acid, in a variety of thicknesses and equivalent weights. The PCM is typically coated on each face with an electrocatalyst such as platinum, or platinum/ruthenium mixtures or alloy particles. A PCM that is optimal for fuel cell applications possesses a good protonic conductivity and is well-hydrated. On either face of the catalyst coated PCM, the MEA typically includes a diffusion layer. The diffusion layer on the anode side is employed to evenly distribute the liquid or gaseous fuel over the catalyzed anode face of the PCM, while allowing the reaction products, typically gaseous carbon dioxide, to move away from the anode face of the PCM. In the case of the cathode side, a diffusion layer is used to allow a sufficient supply of and a more uniform distribution of gaseous oxygen to the cathode face of the PCM, while minimizing or eliminating the collection of liquid, typically water, on the cathode aspect of the PCM. Each of the anode and cathode diffusion layers also assist in the collection and conduction of electric current from the catalyzed PCM through the load.

Direct oxidation fuel cell systems for portable electronic devices ideally are as small as possible for a given electrical power and energy requirement. The power output is governed by the reaction rates that occur at the anode and the cathode of the fuel cell operated at a given cell voltage. More specifically, the anode process in direct methanol fuel cells, which use acid electrolyte membranes including polyperflourosulfonic acid and other polymeric electrolytes, involves a reaction of one molecule of methanol with one molecule of water. In this process, water molecules are consumed to complete the oxidation of methanol to a final $CO_2$ product in a six-electron process, according to the following electrochemical equation:

$$CH_3OH + H_2O \Rightarrow CO_2 + 6H^+ + 6e^- \tag{1}$$

Since water is a reactant in this anodic process at a molecular ratio of 1:1 (water:methanol), the supply of water, together with methanol to the anode at an appropriate weight (or volume) ratio is critical for sustaining this process in the cell. In fact, it has been known that the water:methanol molecular ratio in the anode of the DMFC has to significantly exceed the stoichiometric 1:1 ratio suggested by process (1), based on the prior art of direct methanol fuel cell technology. This excess is required to guarantee complete anodic oxidation to $CO_2$, rather than partial oxidation to either formic acid, or formaldehyde, $4e^-$ and $2e^-$ processes, respectively, described by equations (2) and (3) below:

$$CH_3OH + H_2O \Rightarrow HCOOH + 4H^+ + 4e^- \tag{2}$$

$$CH_3OH \Rightarrow H_2CO + 2H^+ + 2e^- \tag{3}$$

In other words, equations (2) and (3) are partial processes that are not desirable and which might occur if the balance of water and methanol is not maintained correctly during a steady state operation of the cell. Particularly, as is indicated in process (3), which involves the partial oxidation of methanol, water is not required for this anode process and thus, this process may dominate when the water level in the anode drops below a certain point. The consequence of process (3) domination, is an effective drop in methanol energy content by about 66% compared with consumption of methanol by process (1), which indicates a lower cell electrical energy output. In addition, it could lead to the generation of undesirable anode products such as formaldehyde.

Several techniques have been described for providing an effective methanol/water mixture at the anode catalyst in a DMFC. Some systems include feeding the anode with a very diluted methanol solution and pumping excess water found at the cathode back to the cell anode and dousing recirculated liquid with neat methanol stored in a reservoir. Other systems are passive systems that require no pumping and which can carry a high concentration of fuel. Some of these include recirculation of water; however, other systems have been described in which water does not need to be recirculated from the cathode because water is pushed back from the cathode through the membrane to the anode aspect.

Such systems were described in commonly-assigned U.S. patent application Ser. No. 10/413,983, filed on Apr. 15, 2003, by Ren et al. for a DIRECT OXIDATION FUEL CELL OPERATING WITH DIRECT FEED OF CONCENTRATED FUEL UNDER PASSIVE WATER MANAGEMENT, which is incorporated herein by reference, and U.S. patent application Ser. No. 10/454,211, which was filed on Jun. 4, 2003 by Ren et al. for PASSIVE WATER MANAGEMENT TECHNIQUES IN DIRECT METHANOL FUEL CELLS, which is incorporated herein by reference.

Some of these techniques may incorporate a vaporous fuel being delivered to the anode aspect for the reactions. In the case of delivering a vaporous fuel, the above-cited patent applications describe providing a methanol delivery film, which is a pervaporation membrane that effects a phase change from a liquid feed fuel to a vaporous fuel, which is then delivered to the anode aspect, as a vapor.

As noted, the fuel cells operating with vaporous fuels typically include the above-mentioned pervaporation membrane, which effects the phase change from liquid to vapor prior to the fuel being delivered to the anode aspect of the fuel cell. However, such pervaporation membranes may need to be specially engineered, which can be costly. In addition, such membranes, though useful for delivering the vaporous fuel, can, in time, have stability issues in which gas expansion or mass transport rates through the membrane cause deformations in the pervaporation membranes.

While the fuel is in a liquid phase, or in systems which use a liquid fuel, the liquid can, in some instances, require additional circulation systems, including, pumps, valves and other fluid management components and control systems if it is to be delivered at a controlled rate. This can lead to additional components that may cause passive losses within the system, or can increase the cost due to the increased complexity. In addition, for direct oxidation fuel cells to be implemented commercially for use in handheld electronic devices or other portable electronic devices and in such a case, form factors are critical. However, additional recirculation loops, as well as pumps, valves and other hydraulic equipment and components for liquid management may increase the size of the overall fuel cell system. A liquid fuel can also require a more complex delivery cartridge that may include an expansion bladder, which, when compressed, expresses the fuel in a controlled manner. However, even though such expansion bladders and optional force-applying elements may be desirable in some instances, in other instances they can increase the volume, complexity and weight of the fuel delivery cartridge.

Some of the disadvantages with certain liquid fuel fed systems can be addressed using a vapor fed system, such as that described in the above-cited commonly owned U.S. patent application Ser. No. 10/413,983, which has been incorporated herein by reference, but such systems use a liquid fuel which then undergoes a phase change when passing through a pervaporation membrane, and thus such systems still may need to carry liquid fuel in a storage tank or other container.

Another issue that arises with respect to usage of carbonaceous fuel, such as methanol, in a consumer electronic device, is that of maintaining the integrity of the cartridge so that there is no leakage of the fuel. For example, when using a liquid fuel, a crack in the fuel cartridge may result in the fuel leaking out of the cartridge. Sometimes additives are employed within a container to cause the fuel to be more recognizable. Safe disposal of fuel cartridges after the fuel supply is exhausted is also a consideration with respect to consumer use of direct oxidation fuel cells.

Therefore, there remains a need for a fuel substance, and an associated fuel cartridge in which there is no need for liquid pumps, valves and recirculation loops, and there is no need for a pervaporation membrane. It is also an object of the invention to provide a safe, easy to handle and low-cost fuel substance and associated fuel cell cartridge for use with direct oxidation fuel cells that may be readily employed in consumer electronic devices.

SUMMARY OF THE INVENTION

The disadvantages of these and other techniques are overcome by the solutions provided by the present invention, which includes a unique fuel substance to which a thickening substance is added, to form a gel. As used herein, the word "fuel substance" shall include a carbonaceous fuel substantially comprised of alcohols such as methanol and ethanol, alcohol precursors, dimethyloxymethane, methylorthoformate or combinations thereof and aqueous solutions thereof, and other carbonaceous substances amenable to use in direct oxidation fuel cells and fuel cell systems. The illustrative embodiment of the invention includes neat methanol as the fuel substance.

The thickening substance may include any of a variety of polymers. The illustrative embodiment of the invention includes a thickening substance sold commercially under the trade name Carbopol®, which is a hydrophobically modified cross-linked polyacrylate polymer designed to impart thickening, stabilizing and suspending properties to other substances.

Depending upon the thickening substance being employed, it may be desirable, in addition to the thickening substance, to add a further substance to balance the pH of the mixture, because the fuel substance can become acidic when certain thickening substances are added to neat methanol. A suitable pH balancing substance is, for example, sodium hydroxide. In addition, it may be desirable to include additives, including but not limited to colorants, odorants, bitters and other additives that provide desired functionality. Alternatively, it may be desirable to modify the thickening substance in such a fashion that functional groups are attached to the polymer.

The fuel substance combined with the thickening substance, and additives, if any, together form the unique "gel fuel" of the present invention, having sufficient viscosity such that it obviates the need for complex recirculation loops, pumps and valves and other components required with most liquid fuels, and additionally minimizes undesired leakages, thus allowing a highly concentrated, vaporous fuel substance to be delivered to an associated fuel cell.

The gel fuel may then be placed into a fuel cartridge constructed in accordance with the present invention. The fuel cartridge has one aspect or wall, at least a portion of which, is covered with a fuel permeable membrane or porous material to confine the gel fuel to the cartridge, while allowing the delivery of vaporous fuel substance, such as methanol to the fuel cell system. More specifically, as the fuel substance, e.g. methanol, evaporates out of the gel, it is delivered as a vapor to an associated direct oxidation fuel cell to thereby create the fuel cell reactions that produce electricity as described above.

The fuel permeable membrane that is disposed upon at least a portion of the cartridge of the present invention is referred to herein as the fuel vapor-permeable layer ("FVPL") and it may be comprised of one of a number of various alternative materials. For example, in a first embodiment of the invention, the FVPL is a monolithic layer of a material that has good selectivity between water and fuel substances, which allows the fuel substance to pass through it from the fuel cell cartridge to the anode aspect of the direct oxidation fuel cell, and substantially prevents water from travelling back into the fuel cartridge.

In accordance with another aspect of the invention, the FVPL is substantially comprised of a porous membrane, which is non-selective and allows water to pass back through the FVPL into the fuel cell cartridge. In this case, the fuel cell cartridge includes surface area increasing features that expand the overall surface area of the gel fuel that is exposed to air, even though the gel mass decreases. This enables a constant vaporous fuel delivery rate with usage and moreover, the hydrophilic gel fuel, which absorbs water, provides water management. Another functional aspect of these features is to stabilize the gel. Other embodiments include a wire mesh FVPL, or a cartridge with no FVPL Further, in accordance with the invention, a peelable methanol-impermeable film is bonded over the FVPL to seal the fuel substance during storage and transport until the time of use, at which time the peel-off seal is removed from the cartridge, thus exposing the methanol-permeable film.

The inventive fuel cell cartridge can be attached to a direct oxidation fuel cell, thus comprising a direct oxidation fuel cell system, which can be used to power an application device or to back up a battery that is powering an application device. Alternatively, the gel fuel of the present invention can be disposed directly into a suitable compartment in an application device or in a fuel cell system.

BRIEF DESCRIPTION OF THE DRAWINGS

The invention description below refers to the accompanying drawings, of which:

FIG. 4A is a schematic cross section of a fuel cartridge in accordance with the invention, which includes surface area increasing features;

DETAILED DESCRIPTION OF AN ILLUSTRATIVE EMBODIMENT OF THE INVENTION

Fuel Substance Composition and Properties

Figure 1:
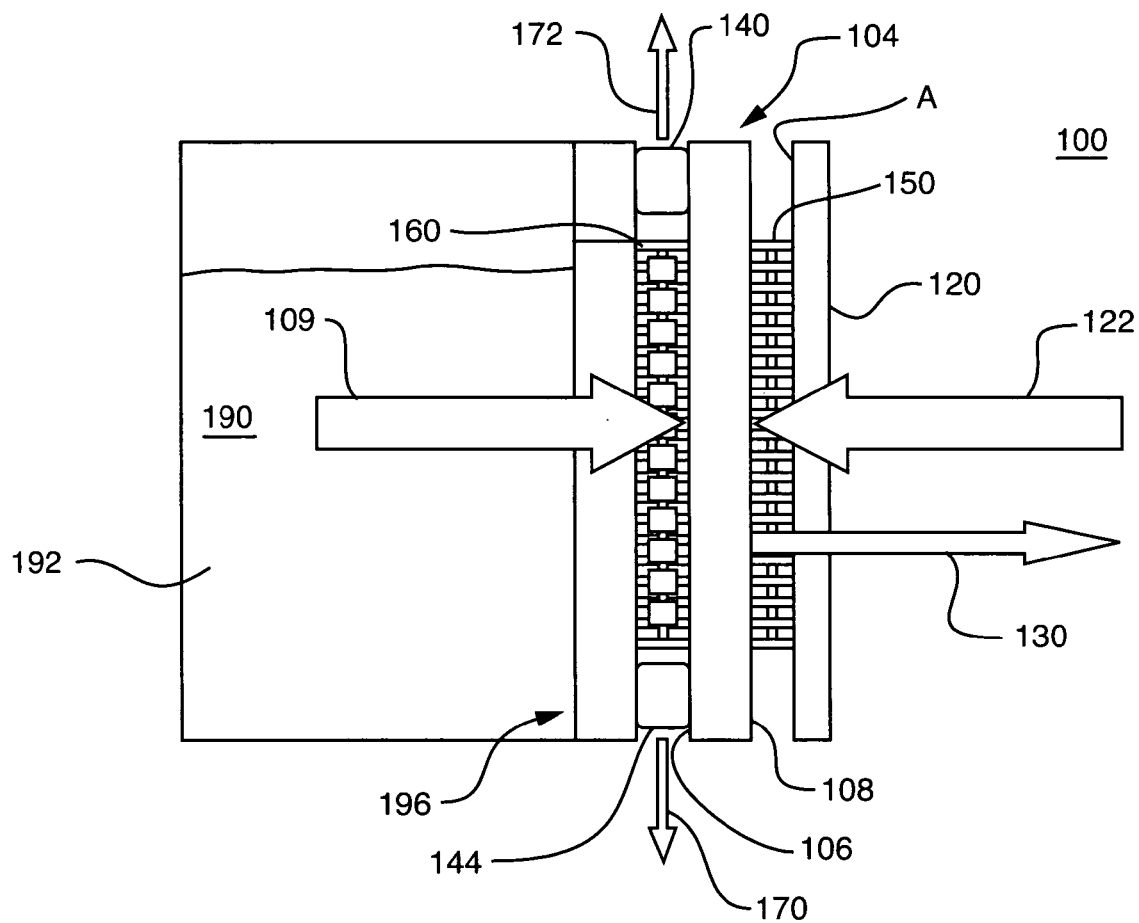
FIG. 1 is a schematic illustration of a portion of the fuel cell system with the cartridge of the present invention attached thereto.

In accordance with the present invention, a gel fuel is formulated from a fuel substance, thickening substances, and additives, if any, for use in a direct oxidation fuel cell. A substantial portion of the composition of the fuel substance is neat methanol. A thickening substance is added, which imparts thickening, thereby increasing viscosity, as well as adding stabilizing and suspending properties to the neat methanol. In accordance with one implementation of the invention, the thickening substance is a chemical sold commercially under the trademark Carbopol® EZ-3 helogy modifier, which is a hydrophobically modified cross-linked polyacrylate polymer sold by Noveon, Inc. of 9911 Brecksville Road, Cleveland, Ohio 44141-3247, USA.

Depending on the precise formulation of the thickener, it may be necessary or desirable to include a pH balancing substance. In accordance with one aspect of the invention, sodium hydroxide is added to balance the pH. The substance can become acidic (with an approximate pH of 4.0) when the Carbopol® EZ-3 is added. Balancing the pH is desirable because it protects the components of the fuel cell cartridge, to be described herein, from the potentially corrosive gel fuel mixture.

The following table provides one example of the chemical composition of the gel fuel in accordance with the present invention.

| Components | Grams | % Make Up by weight |
|---|---|---|
| Carbopol ® | 4.82 | 1.66 |
| Neat Methanol | 285.35 | 98.30 |
| Sodium Hydroxide | 0.12 | 0.04 |
| Totals | 290.29 | 100.00 |

Thickening and pH Balancing Substances

Other thickeners or solidifying substances, other than these mentioned herein, may be used while remaining within the scope of the invention. The thickening substance may, by way of example, and not by way of limitation, be selected from a group consisting of cross-linked vinyl polymers or uncross-linked vinyl polymers including poly alkyl acetates, polyalkyl acrylates, poly (N-alkylacrylamides), vinyl alkanoates, poly acrylic acids, polymethacrylic acid, alkyl esters, polyacryl amides, polyvinyl amines, polymers or copolymers containing monomers containing cationic ion-exchange groups.

In addition cellulose polymers, such as cellulose ether, hydroxyethyl cellulose, hydroxypropyl methyl cellulose, ethyl cellulosestarches, preegellatinized starch, polysaccharides, protein gels, or silicone oil (poly dimethyl siloxane), polyurethane gel may be used to form the thickening substance. The gel thickening substance may be any of an ionic, non-ionic or amphoteric substance.

Similarly, other pH adjusters, such as alkaline metal hydroxide, alkaline earth metal hydroxide, ammonium, amine may be used to adjust an acidic gel fuel mixture containing polymeric acid to bring the pH of the gel fuel substance to neutral or otherwise adjust the pH of the gel fuel substance while remaining within the scope of the present invention.

Viscosity

It is desirable to formulate the gel fuel with sufficient viscosity such that it remains gelatinous at the relevant operating and ambient temperatures of the fuel cell with which it is to be used. For example, and not by way of limitation, neat methanol at 25 degrees Celsius and at standard pressure, has a viscosity of 0.544 millipascal seconds (mPa s). In order to achieve the desired results and benefits, it is necessary to alter the viscosity of the fuel substance such that its viscosity is at least 100 mPa s, and preferably greater than 1000 mPa s at 25 degrees Celsius and at standard pressure. In accordance with one embodiment of the invention, the composition of which is set forth in the above table, the viscosity was measured at 48,000 mPa s at 25 degrees Celsius using a Brookfield rotational; Viscometer following ASTM D2196-99 procedure.

By increasing the viscosity of the gel fuel, various fuel delivery systems which provide significant benefits, can be implemented. The thickening substance preferably constitutes a very small fraction of the gel fuel, typically about 1% by weight, and preferably about 0.5% by weight, though it may be necessary or desirable to increase the amount of the thickening substance to increase viscosity. In other circumstances, a less viscous gel fuel may be desirable in which case a different percentage or type of thickener can be used. Thus the viscosity of the gel fuel can be readily adjusted depending upon the particular application with which the invention is to be employed.

Once the gel is formulated, in accordance with the above-identified composition, additional neat methanol can be added if it is desired to obtain a lower solids content. In addition, deionized water can be added to achieve a lower molarity concentration and a lower solid content, depending upon the particular application with which the invention is to be employed. Other liquids could also be added including, as noted, additional methanol or to increased water in order to decrease the molarity of the mixture. When additional liquid is added in general, solid content goes down, which may lead to a more efficient volumetric use of the space within the fuel cell cartridge as described hereinafter.

Additives

As noted herein, safety additives can be suspended in the gel fuel in order to minimize at least some hazards that may be associated the use of the fuel substance. These examples include colorants, flame luminosity, bitters, and other such chemicals which render the gel fuel more recognizable to the consumer so that hazardous contact therewith can be avoided. In addition, flame-retardants can be added to the gel fuel to minimize the risk of fire hazard.

The gel can also contain other polymeric additives to incorporate desired properties to the gel. For example, a polymeric ingredient forms a polymer film on the gel surface at high temperatures to decrease the methanol evaporation rate. For example, polymerization by condensation of —OH groups can be excited at elevated temperatures, such as high temperatures caused by an overheated abnormal fuel cell operation or fire. A lowered methanol evaporation rate is thus provided by the polymeric film, which forms a protective skin over the gel and thus adds the benefits of safety to the fuel cartridge and fuel cell operation in case of high temperature conditions.

Alternatively, the thickening substance can be modified and functional groups added to the thickening substance, which will improve the safety of the gel fuel.

Further additives can be those which enhance the performance or concentration of the fuel substance. These additives can include, for example, substances that provide additional hydrogen liberation, such as metal hydrides such as $LiAlH_4$, $NaBH_4$, $LIBH_4$, $(CH_3)_2 NHBH_3$, $NaAlH_4$, $B_2H_6$, $NaCNBH_3$, $CaH_2$, $LiH$, $NaH$, $KH$ or sodium is (2-methoxy-ethoxy) dihydridaluminate, from which hydrogen is liberated in the presence of water, upon reaching a threshold temperature, which is dependent on the fuel mixture, and the compound that is added.

Alternatively, methyl formate or other fuel precursors can be added which, when combined with water, forms methanol thus increasing methanol concentration and stabilizing the rate of delivery of methanol vapor as the gel fuel is used up. Other potentially desirable fuel precursors where methanol or an aqueous methanol solution is the fuel substance include, but are not limited to: dimethyloxymethane, methyorthoformate, tetramethylorthocarbonate, trimethylborate, and tetramethylorthosilicate.

Water management substances, which absorb water that passes into the gel, may also be added to the gel fuel. By way of example and not by way of limitation various silicone gels, zeolites, $CaO$ $CaSO_4$ and other water-absorbing substances may be suspended in the gel for the purpose of minimizing the dilutive effect of water that enters the gel.

There are also additives, which can enhance the fuel substance itself, and such fuel additives can become increasingly effective when the non-soluble particles are suspended in the gel fuel of the present invention. For example, one or more of the following substances (some of which have been mentioned herein) may be added in appropriate concentrations: dimethyloxymethane, methyorthoformate, tetramethyl orthocarbonate, trimethyl borate, and tetramethyl orthosilicate, and/or hydrogen containing inorganic compounds, such as metal hydrides such as $LiAlH_4$, $NaBH_4$, $LiBH_4$, $(CH_3)_2 NHBH_3$, $NaAlH_4$, $B_2H_6$, $NaCNBH_3$, $CaH_2$, LiH, NaH, KH or sodium bis (2-methoxyethoxy) dihydridaluminate. Examples of the safety enhancing indicators include small concentrations of activated carbon black, and bitter tasting compounds such as denatonium benzoate. Further details regarding each of these additives are described in a commonly-assigned U.S. patent application Ser. No. 10/688,711, filed on even date herewith, by Ren, et al., for FUEL COMPOSITION IN FUEL CARTRIDGES FOR DMFCS, which is presently incorporated by reference herein.

Functionally, the gel fuel that includes the fuel substance, such as methanol, is a liquid that is suspended within the gel, which is a polymeric structure. When the gel fuel is exposed, the methanol evaporates from the gel fuel and the vaporous methanol passes through an optional FVPL (described in detail hereinafter), and is introduced to the fuel cell system. Methanol delivery is further driven by the concentration gradient that is established between the gel fuel and the anode aspect of the fuel cell system as methanol is consumed in the electricity generating reactions. The inventive gel fuel may be placed in a cartridge designed in accordance with the present invention to provide controlled delivery of the methanol vapor to an associated direct oxidation fuel cell system.

Fuel Cartridge

More specifically, FIG. 1 is a simplified schematic illustration of one embodiment of a direct oxidation fuel cell that may be used with the present invention. The figure illustrates one embodiment of a direct oxidation fuel cell for purposes of description, though the fuel cell with which the invention is actually used may include a number of other components in addition to those shown while remaining within the scope of the present invention. Many alternative fuel cell architectures are within the scope of the present invention. Further, the illustrative embodiment of the invention is a DMFC with the fuel substance being substantially comprised of neat methanol. It should be understood, however, that it is within the scope of the present invention that other fuels may be used in an appropriate fuel cell. Thus, as noted, the word "fuel substance" shall include a substance that is substantially comprised of alcohols such as methanol and ethanol, alcohol precursors, dimethyloxymethane, methylorthoformate or combinations thereof and aqueous solutions thereof, and other carbonaceous substances amenable to use in direct oxidation fuel cells and fuel cell systems.

The fuel cell 100 (FIG. 1) includes a catalyzed membrane electrolyte 104, which may be a protonically conductive, electronically non-conductive membrane, sometimes referred to herein as a "PCM". As noted, in certain applications of the invention, an intrinsically protonically conductive membrane may be employed, though the invention is not limited to such membranes. One example of the material that may be used for the catalyzed membrane, which is commercially available is NAFION®, a registered trademark of E.I. Dupont de Nemours and Company, a cation exchange membrane based on a polyperflourosulfonic acid in a variety of thicknesses and equivalent weights. The membrane is typically coated on each face with an electrocatalyst such as platinum or a platinum/ruthenium mixture or allied particles. Thus, following the application of the appropriate catalyst, it is referred to herein as the "catalyzed membrane electrolyte." One face of the catalyzed membrane electrolyte is the anode face or anode aspect 106. The opposing face of the catalyzed membrane electrolyte 104 is on the cathode side and is herein referred as the cathode face or the cathode aspect 108 of the membrane electrolyte 104.

The anode reaction is: $CH_3OH+H_2O \Rightarrow 6H^++6e^-+CO_2$. In accordance with this reaction, one molecule of methanol and one molecule of water react at the anode face 106 of the membrane electrolyte 104, the result of which is that 6 protons ($6H^+$) cross through the membrane 104. This is made possible by the well-hydrated NAFION® substance of the membrane, which allows the protons to be carried across the membrane 104. On the cathode side, ambient air is introduced into the cathode portion of the fuel cell 100 via optional cathode filter 120 as illustrated by the arrow 122. The reaction at the cathode aspect 108 of the membrane 104 is $$6H^+ + 6e^- + \frac{3}{2}O_2 \Rightarrow 3H_2O.$$

Thus, the protons and electrons combine with oxygen in the ambient air at the cathode face 108 to form water ($H_2O$). This water can escape from the cathode face of the cell primarily in the form of water vapor, but also as liquid water as illustrated by the arrow 130.

At the anode side, the fuel is delivered through anode diffusion layer 160 (in the direction of arrow 109), and the anode reaction includes the generation of carbon dioxide at the anode aspect 106 of the membrane 104. Carbon dioxide exits the fuel cell 100 via carbon dioxide removal channels, or openings, illustrated at 140 and 144, in the direction of the arrows 172 and 170, respectively.

It is desirable to avoid excess water loss at the cell cathode in order for the cell to be operable with neat methanol feed at the cell anode without water recovery from cell cathode. To prevent liquid water from penetrating through the cathode backing, a highly hydrophobic backing layer 150 with sub-micrometer pores is used. The static hydraulic pressure generated by the capillary force of the hydrophobic micropores and exerted on the liquid water is sufficiently high to drive the liquid water back, even through a nonporous polymer electrolyte membrane, such as NAFION®, to the cell anode. In accordance with the present invention, the gel fuel 190 is contained within a fuel cartridge 192 that is then connected to the fuel cell 100, at FVPL 196. The utility of the invention disclosed herein is not limited to the fuel cell architecture disclosed herein, or any other particular fuel cell, rather it is applicable to any fuel cell system or architecture in which an unreformed, carbonaceous, vaporous fuel is delivered to the anode aspect of the fuel cell.

Figure 2:
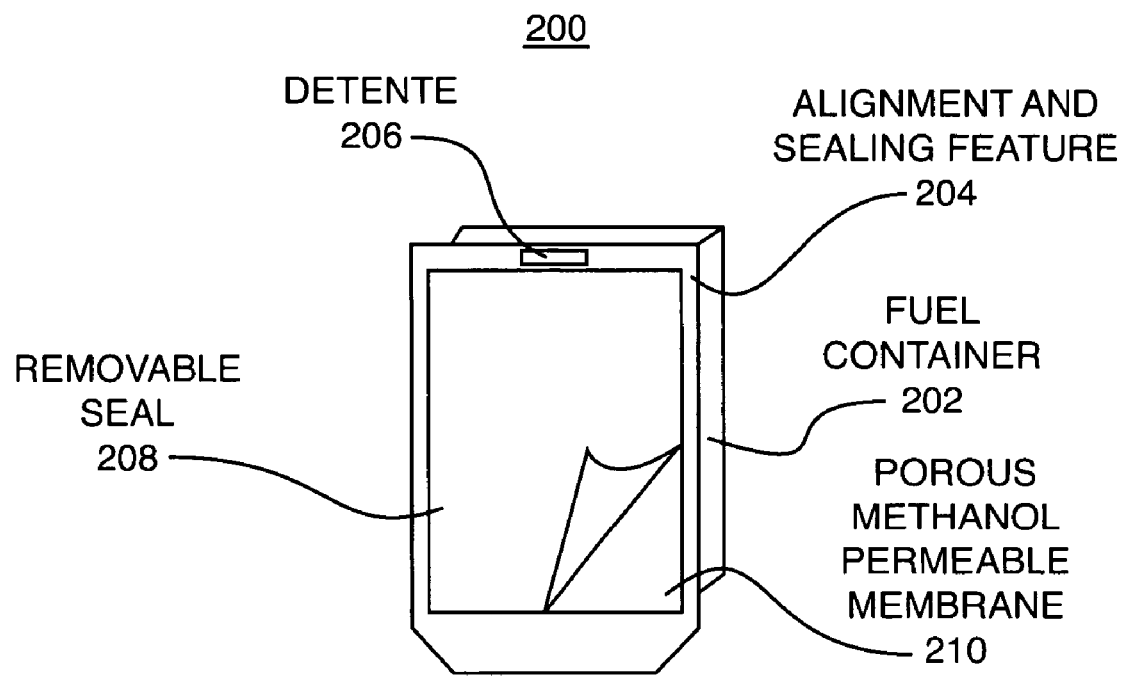
FIG. 2 is an isometric illustration of a fuel cartridge in accordance with the present invention.

Several different aspects of the invention will now be described with reference to FIGS. 2 through 5A-5C, and it should be understood that the various geometries and components for the fuel cartridges illustrated in those figures may alternatively be employed as the fuel cartridge 192 in FIG. 1, or as one component within the fuel cartridge 192 of FIG. 1. Referring to FIG. 2, a fuel cell cartridge 200, in accordance with the present invention, is illustrated. The fuel cell cartridge 200 has a fuel container compartment 202 that houses the gel fuel. A frame 204 that may include alignment and sealing features, couples the cartridge 200 to the fuel cell (not shown in FIG. 2), and the frame 204 can be readily adapted to provide a robust sealed fluid connection to the application device or fuel cell system being fueled by the gel fuel, in accordance with the present invention. A detente 206 allows for fastening and detachment of the fuel cartridge 200 to and from the fuel cell (not shown).

A removable seal 208 is provided to cover the FVPL 210 in order to prevent the undesired escape of the fuel substance vapors or gel fuel from the cartridge prior to connecting the fuel cartridge to the fuel cell system. The removable seal 208 is a peelable, methanol-impermeable film that is bonded over a porous methanol-permeable FVPL 210. The peelable, removable seal 208 seals the gel fuel during storage and transport until the time of use, at which time it can be easily removed from the cartridge 200 exposing the methanol-permeable FVPL 210 through which the methanol fuel substance will be delivered to the fuel cell. Alternatively, a cartridge may be fabricated entirely of a methanol-impermeable material, a portion of which may be removed by the user to expose the gel fuel and FVPL (Not shown).

FVPL Materials

Figure 3:
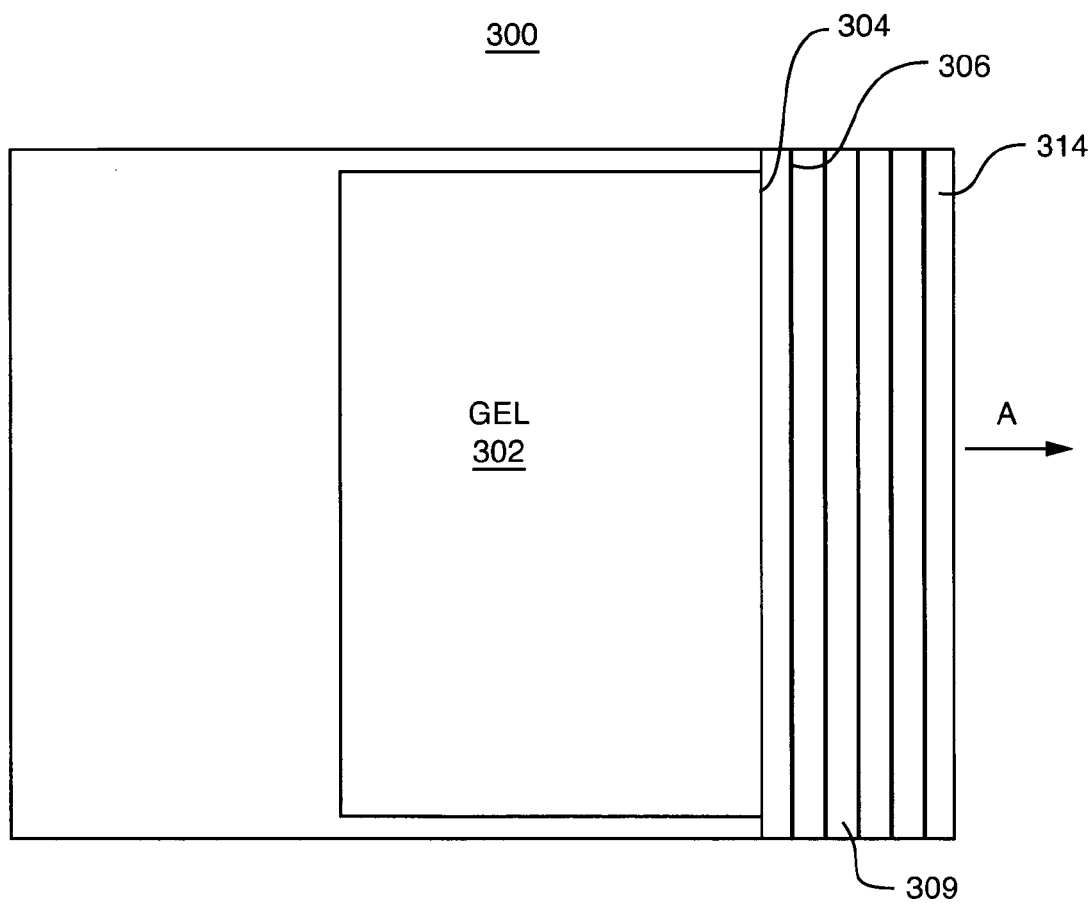
FIG. 3 is a schematic cross section of a fuel cartridge including multiple FVPLs.

In accordance with the invention, the FVPL may be comprised of a number of different materials that each have advantages in certain applications, and may be employed alternatively depending on the requirements and operating conditions of a particular application of the invention. For example, as illustrated in FIG. 3, a fuel cell cartridge 300 contains the methanol gel 302. In the fuel cell cartridge 300 illustrated in FIG. 3, the methanol-permeable FVPL 304 is substantially comprised of a material that is a monolithic barrier with good selectivity for methanol over water, i.e. it will allow more methanol than water to pass through Silicone rubber films are good examples of a suitable selective materials which can be implemented as FVPLs. Urethane is another example of such a permeable film 304 for example, any number of polyurethane membranes or urethane meshes which are selective can be used for this function. The methanol-permeable layer 304 holds back the gel fuel 302 and allows methanol vapor to travel out of the cartridge in the direction of the arrow A. In this instance, the highly selective FVPL 304 does not allow water that has been pushed back through the PCM, to travel back into the cartridge 300. Thus, water is prevented from entering into the fuel cartridge 300.

In this embodiment, it may also be preferred to provide multiple barriers, such as the barriers 306 through 314. Multiple barriers allow better control of the delivery rate of the methanol to the anode aspect of the fuel cell and minimize water introduction into the gel fuel 302. The multiple barriers also even out any incontinuity in the delivery rate that could result from gel being in contact with parts of the barrier surface. The multiple layers 306 through 314 are divided by vapor gaps, such as the gap 309, to ensure a continuous vapor delivery to the anode aspect of the fuel cell.

In accordance with yet another aspect of the invention, the FVPL is a non-selective membrane. This is illustrated in FIG. 4A. The fuel cartridge 400 includes a gel fuel 402, and has an exterior frame 403, over at least a portion of which the FVPL 404 is disposed. The gel fuel 402 includes the methanol that evaporates and flows in the direction of the arrow B across the FVPL 404. In this embodiment, the FVPL 404 is substantially comprised of a porous material, which may be a porous polypropylene, polyethylene, or expanded PTFE, for example.

Features in the Fuel Cartridge

Figure 4B:
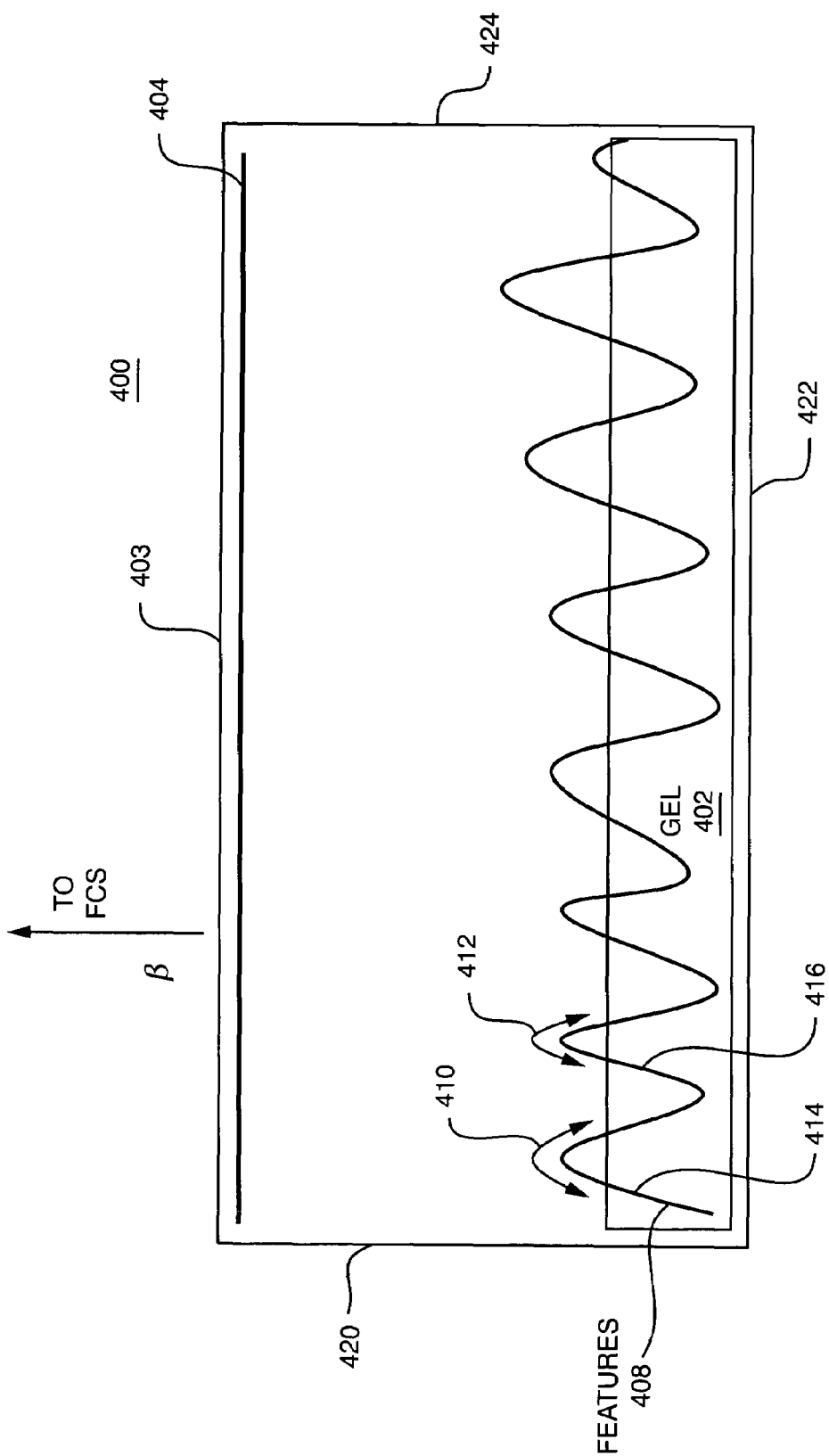
FIG. 4B is the device of FIG. 4A showing the shrinking gel and features to which the gel clings as it shrinks.

In addition, features within the cartridge 400 stabilize the gel 402 such that its mass remains uniformly distributed behind the porous film FVPL 404. These features, such as the corrugated structure 408, increase the surface area of the exposed gel fuel from which methanol is emitted out of the gel, as the gel 402 shrinks. This may be better understood with reference to FIG. 4B. As illustrated in FIG. 4B, the gel 402 has decreased in mass, compared to the gel shown in FIG. 4A. However, as the gel recedes, some of the gel clings to the feature 408 as illustrated by the arrows 410 and 412, on feature components 414 and 416, respectively. In other words, the feature 408 within the cartridge 400 allows the surface area of the methanol gel to increase as its mass decreases. The feature 408 thus enables constant vapor delivery with usage even though the gel is shrinking. Water is absorbed by the gel fuel, which reduces areal methanol delivery flux as measured for example in molecules per square-centimeter since the water dilutes the methanol in the gel fuel. Thus, the additional surface area allows a greater amount of gel fuel to be exposed to counteract the decreasing areal flux and thereby emit a more consistent amount of methanol for delivery to the fuel cell and to absorb a greater amount of water entering the cartridge. The features can have many different geometric shapes, other than the corrugated walls shown in FIG. 4A.

Figure 5A:
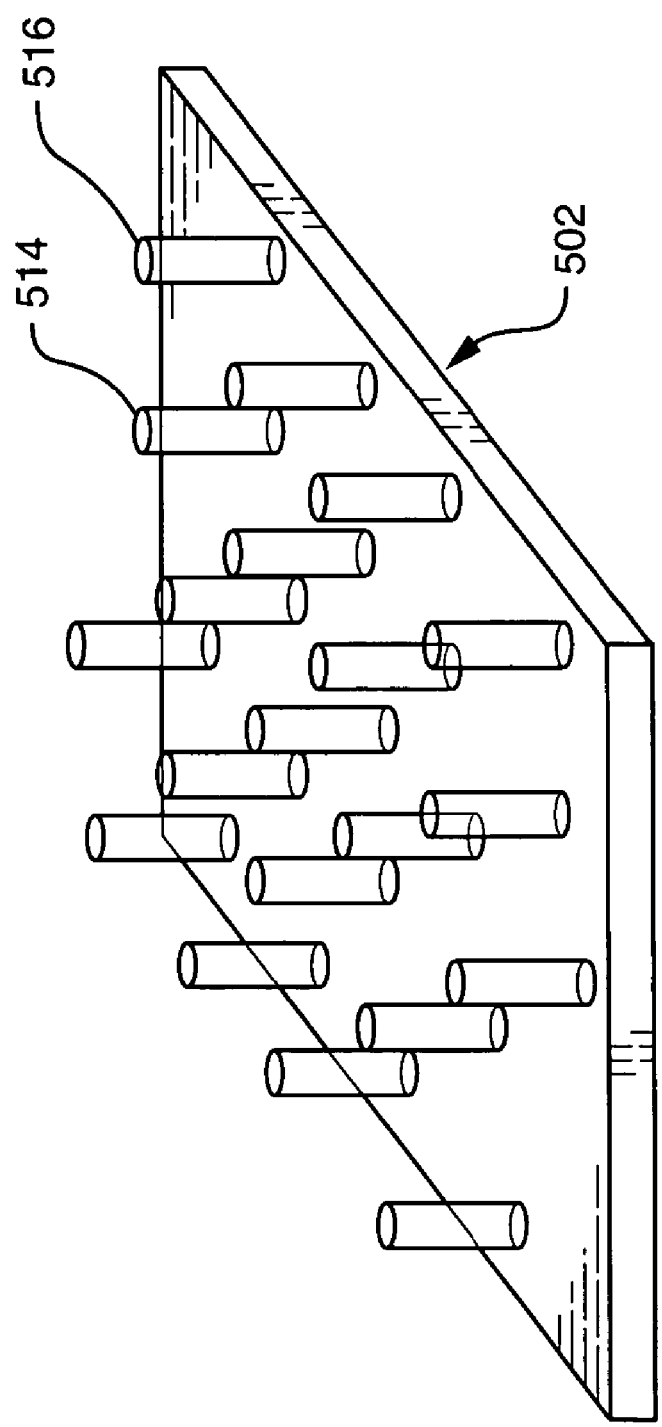
FIG. 5A is a schematic isometric illustration of "bed of nails" features within the fuel cartridge for increasing the surface area of the gel fuel.
Figure 5B:
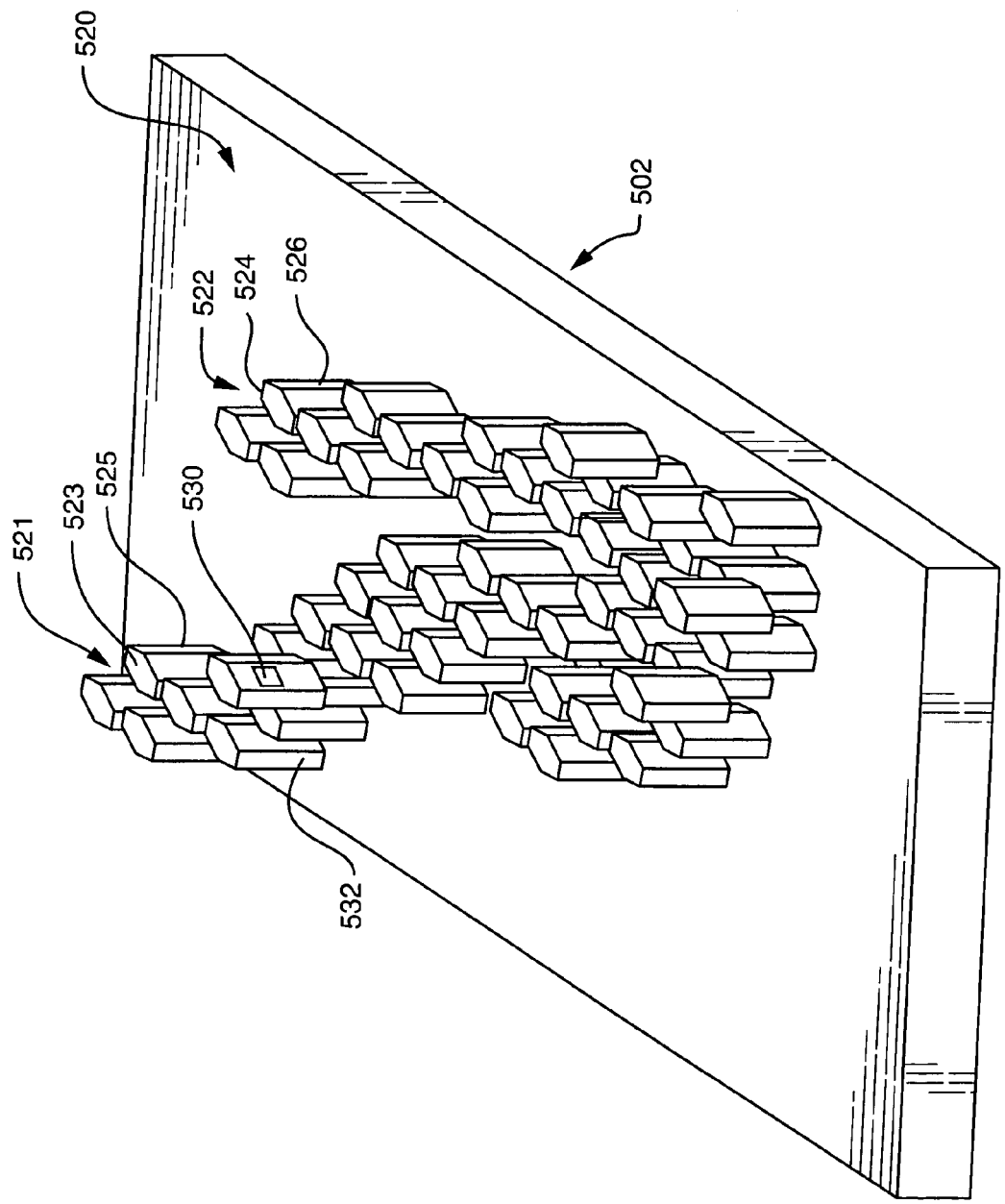
FIG. 5B is a schematic isometric illustration of "honeycomb" features within the fuel cartridge for increasing the surface area of the gel fuel.
Figure 5C:
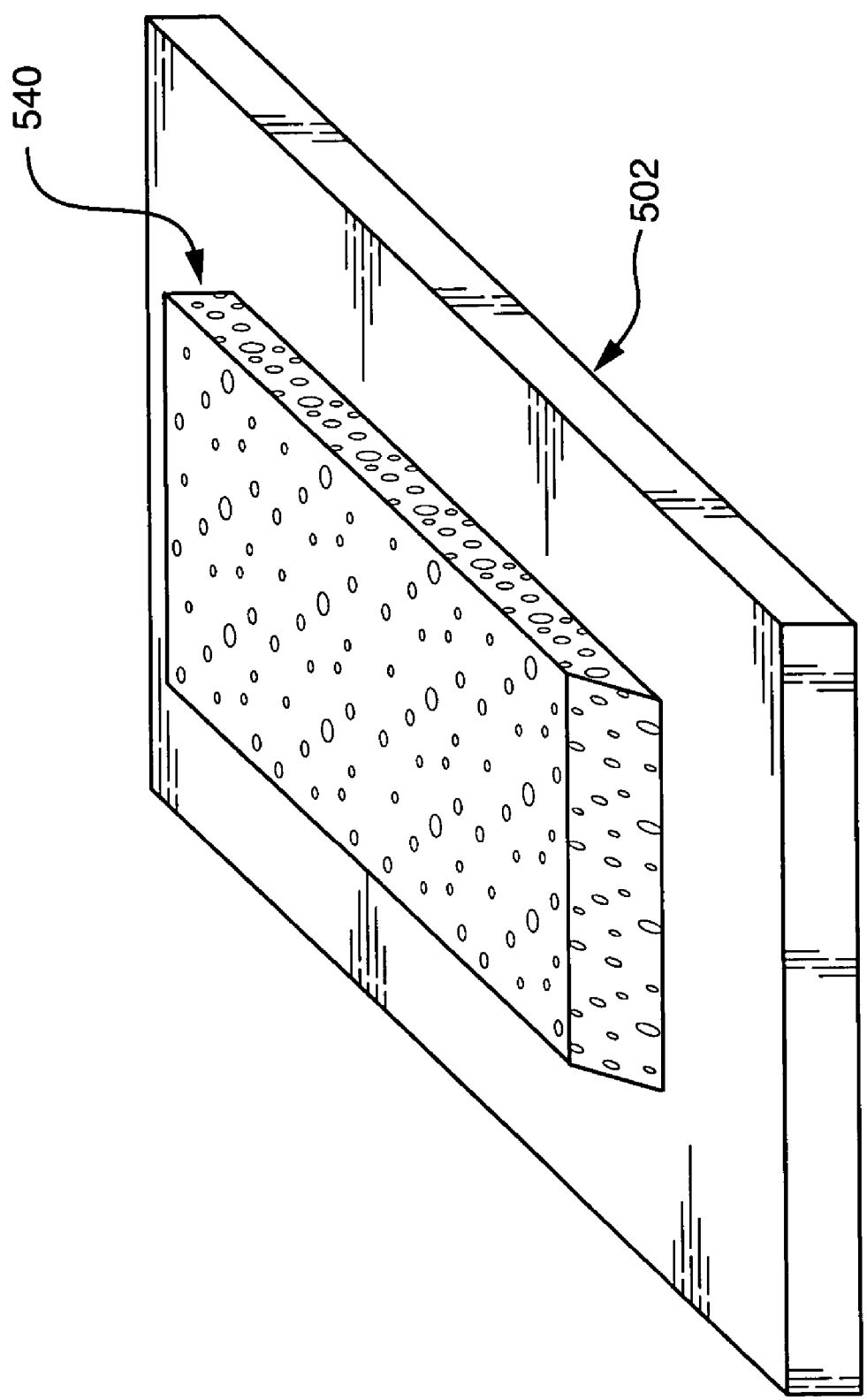
FIG. 5C is a schematic isometric illustration of reticulated foam disposed within the fuel cartridge for increasing the surface area of the gel fuel.

For example, other shapes are illustrated in FIGS. 5A-5C. FIG. 5A illustrates a fuel cartridge wall or aspect 502 that has a "bed of nails" configuration that includes plurality of spikes or nails 514, 516 for example that allow for an increased gel fuel surface area as the gel fuel recedes with usage. In FIG. 5B, the fuel cartridge wall or aspect 502 includes a honeycomb structure 520 with structures 521, 522 that have openings 523 and 524 respectively that may contain gel fuel. In addition, the gel fuel can cling to the outer aspect 525 and 526 of the individual structures 521 and 522, respectively, to thereby increase surface area. In addition, the structures may be provided with slots in the outer aspect, such as the slot 530, through which fuel substance vapor can escape, and via which air can travel into the structure 532, for example. Similarly, as illustrated in FIG. 5C, an open reticulated foam 540 is used that contains the gel fuel and spreads the surface area of the exposed gel fuel throughout the interstices of the foam 540.

In another aspect of the invention, it may be desirable to incorporate similar features within the cell to maintain a more even distribution of the gel fuel within the cartridge, regardless of whether or not a selective FVPL is implemented. It is desirable to maintain a more even distribution of the gel fuel within the cartridge, and it may be desirable to physically prevent the gel fuel from accumulating in a small volume of the cartridge. This is of particular importance where the fuel cartridge and/or fuel cell system may be used or stored in more than one orientation, i.e. "right side up" and "left side up" or "upside down". This can be accomplished by physically constraining the gel fuel within individual compartments in the fuel cell system, using a reticulated foam (FIG. 5C) or by providing structures within the fuel cartridge, such as those just described with reference to FIGS. 5A-5C. As noted, by doing so, the aggregate surface area of the gel fuel within the fuel cartridge becomes greater with usage than the initial surface area of the gel fuel within the fuel cartridge.

Another advantage to including such features is to prevent the gel fuel from flowing to one area of the fuel cartridge depending on the cartridge orientation. If gel fuel is allowed to flow freely inside the cartridge, then the delivery of fuel substance to the fuel cell may become non-uniform. A non-uniform delivery of fuel substance may lead to lower efficiency and lower power output of the fuel cell. Therefore, stabilizing features prevent the flow of gel independent of the orientation of the tank. These features can accomplish both functions of enhancing the effective surface area of the methanol with usage and stabilizing the gel.

A very open TEFLON® mesh barrier could also be used as an FVPL to allow the methanol vapor to pass therethrough towards the fuel cell as a methanol-permeable wall. The absorption of water in the gel reduces or eliminates any residual fluid remaining after the cartridge is used up, and thereby limiting or eliminating the potential for contact of dilute liquid methanol to the customer.

In yet an alternative embodiment of the invention, the cartridge can simply be attached to the anode aspect of the fuel cell without a FVPL and the methanol vapor can simply travel to the anode aspect and be delivered unimpeded to the fuel cell system.

The remaining walls of the cartridge 400 (FIG. 4A), such as the walls 420, 422 and 424 for example, will be comprised substantially of a methanol-impermeable material that does not react with the fuel substance, including, but not limited to high density polyethylene, high density polypropylene, and selected metals, and glasses.

Mechanical components can also be used to control the flow of methanol towards the anode aspect. For example, anode shuttering and other adjustable fuel delivery regulation assemblies were described in commonly-assigned U.S. patent application Ser. No. 10/413,986, which was filed on Apr. 15, 2003 by Hirsch et al. for a VAPOR FEED FUEL CELL SYSTEM WITH CONTROLLABLE FUEL DELIVERY, which is incorporated herein by reference. These can be used to power down the fuel cell, if desired.

In addition to being carried and delivered from the fuel cartridge of the present invention as described herein, the gel fuel of the present invention may be utilized by being added directly to a suitable compartment in an application device, or a suitable compartment in a fuel cell system that may be used to power a separate application device, or to back up or charge a rechargeable battery pack, which may in turn be used to power an application device, or otherwise in a hybrid power supply, or other useful application. These alternative embodiments of the invention are illustrated in FIGS. 6A through 6D.

Figure 6A:
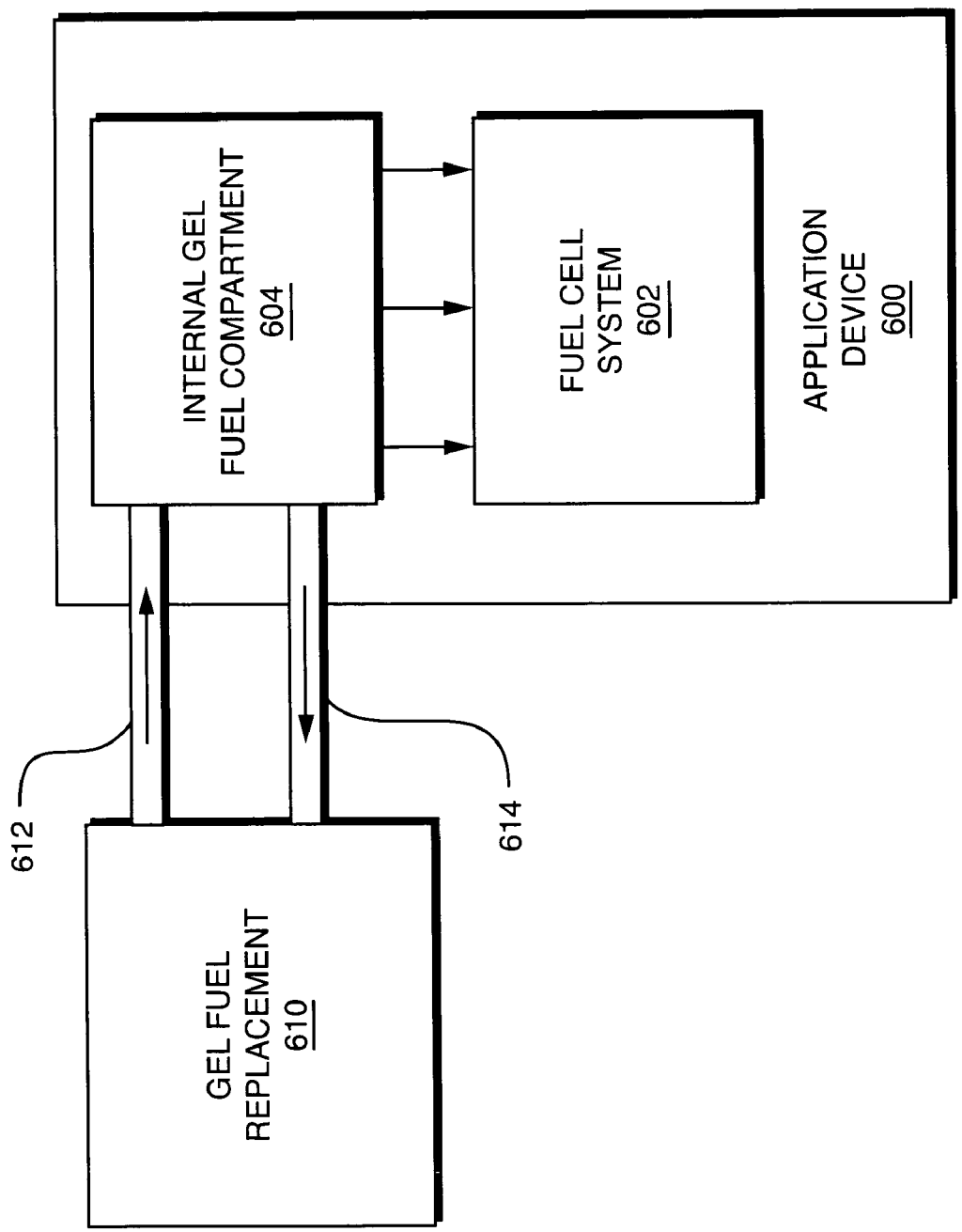
FIG. 6A is a schematic illustration of a gel fuel replacement cartridge coupled to an application device in accordance with the invention.

FIG. 6A illustrates an application device 600 that is powered by a fuel cell system 602 that is either internally disposed or integrated into the application device, or which is mechanically fastened or bonded to, or otherwise attached to the application device. The fuel cell system 602 contains one or more fuel cells (not shown) that produce electricity for operation of the application device 600. The fuel cell system 602 is supplied with fuel from an internal gel fuel compartment 604. The compartment 604 houses the gel fuel of the present invention and delivers the fuel substance contained therein to the fuel cell system 602. When the usable fuel in the gel fuel in the compartment 604 is exhausted, a separate cartridge or canister 610 can be suitably coupled to the application device via conduit 612 and replacement gel fuel is delivered into the internal gel fuel compartment 604. Such a canister was described in commonly-owned U.S. patent application Ser. No. 10/413,982, filed on Apr. 15, 2003, by Becerra et al., for an APPARATUS FOR REFUELING A DIRECT OXIDATION FUEL CELL, which is incorporated by reference herein, and refueling techniques were described in commonly-owned U.S. patent application Ser. No. 10/607,699, filed on Jun. 27, 2003, by Alan J. Soucy, for METHODS OF PROVIDING REFUELING FOR FUEL CELL-POWERED DEVICES, which is incorporated by reference herein.

The replacement gel fuel will either displace the remaining gel in the compartment 604, or a portion of the remaining gel or other substances can be removed, if desired, through an optional conduit 614.

Figure 6B:
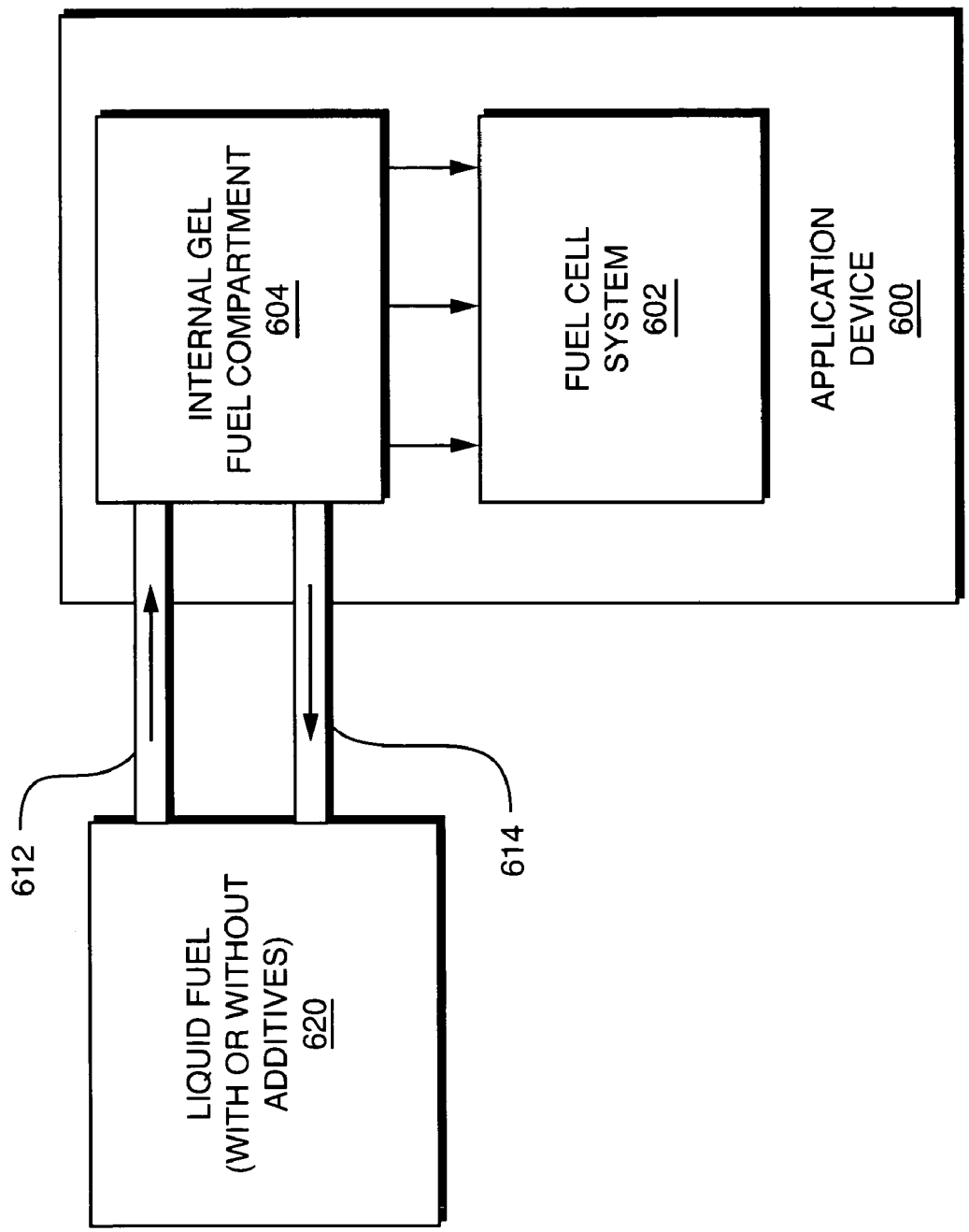
FIG. 6B is a schematic illustration of a liquid fuel replacement embodiment for refueling an application device in accordance with the invention.

FIG. 6B illustrates another embodiment of the invention and like components therein have the same references characters as in FIG. 6A. More specifically, an application device 600 is powered by a fuel cell system 602 that is fueled by the gel fuel of the present invention contained within the compartment 604. However, in the embodiment of FIG. 6B, a liquid fuel is supplied from a suitable cartridge or canister 620. The liquid fuel may or may not contain additives such as those described herein. When the gel fuel in the internal gel fuel compartment 604 is exhausted, the liquid fuel in the cartridge or canister 620 is delivered to the compartment 604 through a conduit 612 in order to reconstitute the gel fuel in the compartment by delivering, for example a fresh supply of fuel substance such as neat methanol to the remaining gel. Optional removal conduit 614 may also be provided to remove all or a portion of the fuel gel, or other substances.

Figure 6C:
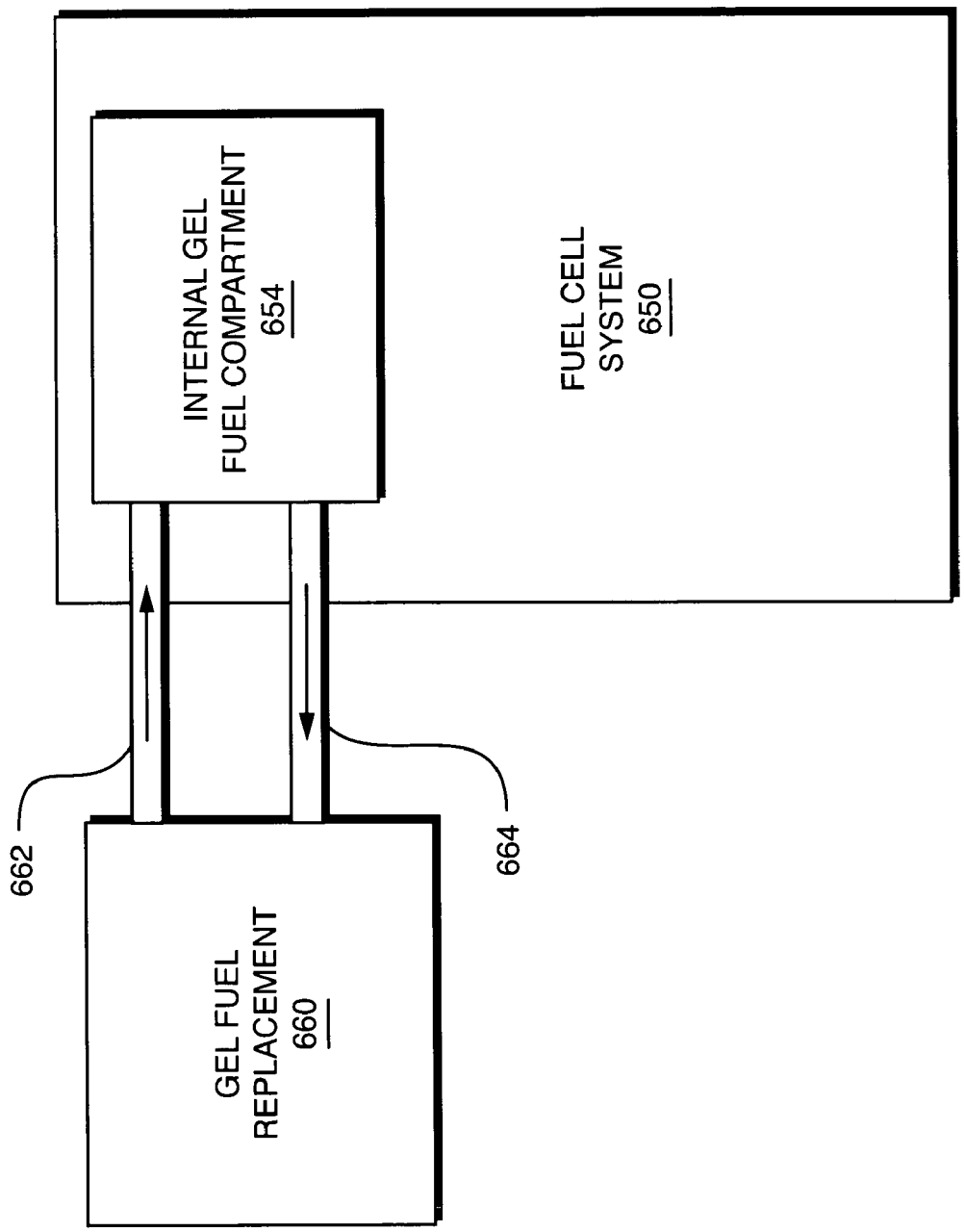
FIG. 6C is a schematic illustration of a gel fuel replacement cartridge coupled to a fuel cell system in accordance with the invention.

FIG. 6C illustrates a fuel cell system 650 that includes an internal gel fuel compartment 654, which contains the gel fuel of the present invention that is delivered to a fuel cell, fuel cell stack or fuel cell array (not shown) contained with the fuel cell system 650. When the gel fuel in the compartment 654 is used, it can be replaced with gel fuel from a cartridge or canister 660 via a conduit 662. The cartridge or canister 660 can be any suitable device such as those described in the above-cited patent applications. An optional conduit 664 allows for removal of excess gel or other substances from the fuel cell system 650, if desired.

Figure 6D:
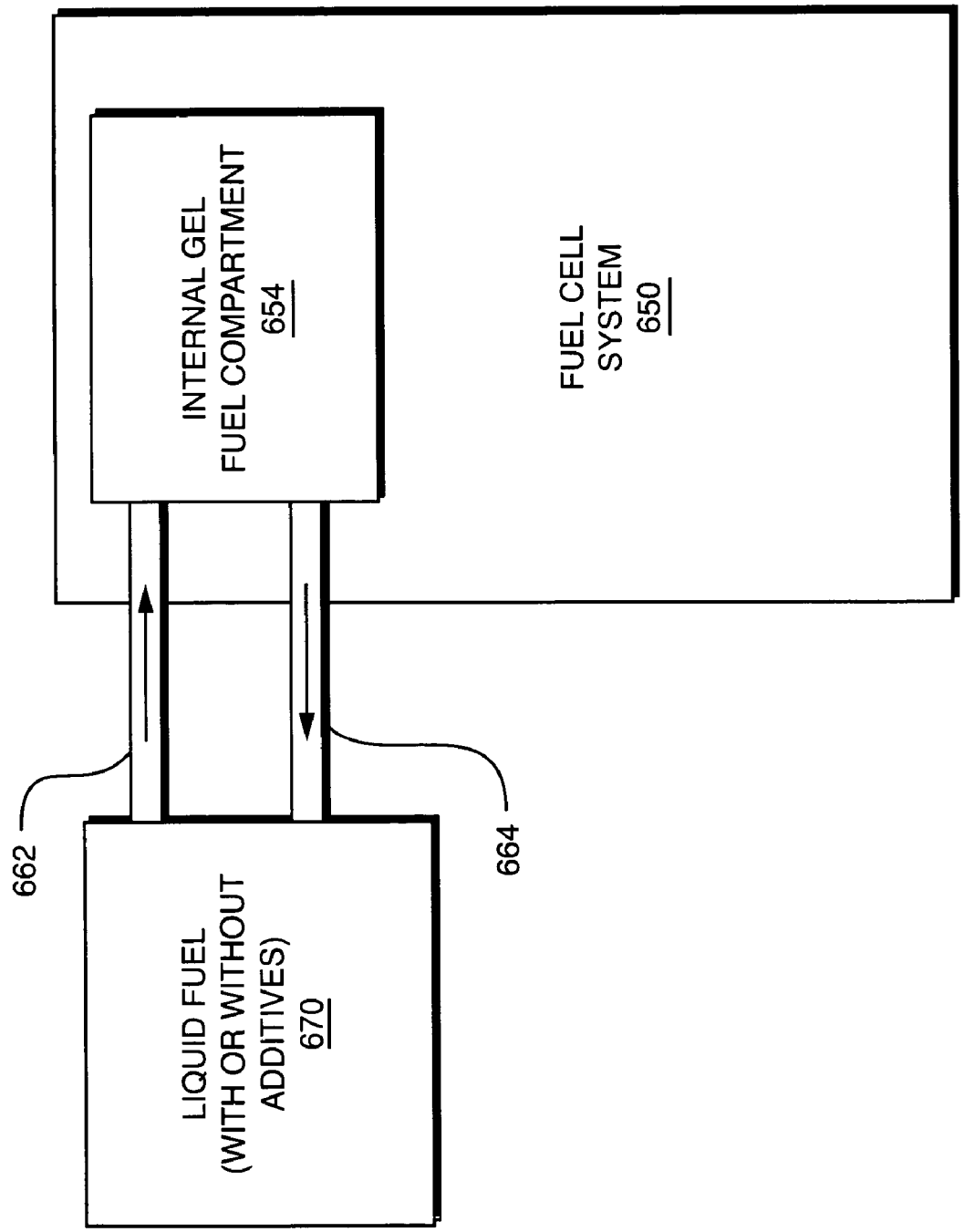
FIG. 6D is a schematic illustration of a liquid fuel replacement embodiment for refueling a fuel cell system in accordance with the invention.

FIG. 6D illustrates another embodiment of the invention and like components therein have the same references characters as in FIG. 6C. More specifically, a fuel cell system 650 includes an internal gel fuel compartment 654 that houses the gel fuel of the present invention. However, in the embodiment of FIG. 6D, a liquid fuel (with or without additives) is supplied from a suitable cartridge or canister 670. When the gel fuel in the internal gel fuel compartment 654 is exhausted, the liquid fuel in the cartridge or canister 670 is delivered to the compartment 654 through a conduit 662 in order to reconstitute the gel fuel in the compartment by delivering, for example a fresh supply of fuel substance (such as neat methanol) to the remaining gel. The optional conduit 664 (as in the embodiment of FIGS. 6C) may be provided to remove exhausted gel or other substances from the fuel cell system 650.

In any of the embodiments described herein, the gel fuel of the present invention may be stored in the sealed cartridge of the present invention or other suitable container until it is ready for use. A seal can be provided which can be removed when the gel fuel is ready for use, or for refueling. It is contemplated that the internal gel fuel compartment, in the embodiments of FIGS. 6A-6D, can be disposed at any convenient, or available space within the device or fuel cell system, and its location will depend upon the particular application of the invention. In the cartridge embodiment, after the usable fuel substance in the cartridge is exhausted, in accordance with one embodiment of the invention, the fuel cartridge can simply be disposed of or recycled when it is empty, and new cartridge can be attached to the fuel cell. In an alternative embodiment, either the cartridge, the application device, or the fuel cell system (whichever is being used in the particular application) may be refueled, as noted herein, using the techniques of the above-incorporated, commonly owned U.S. patent application Ser. Nos. 10/413,982 and 10/607,699.

Figure 6E:
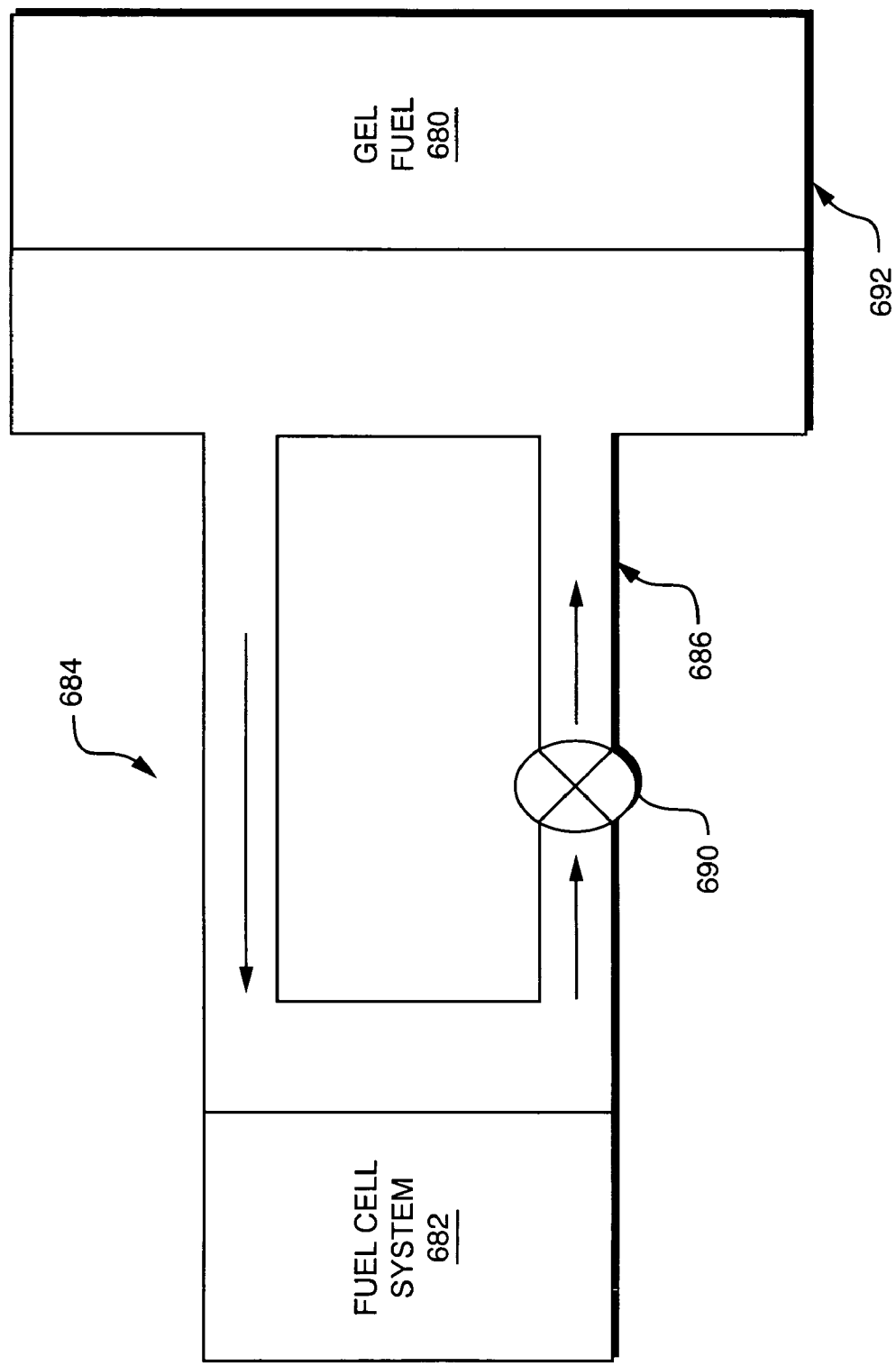
FIG. 6E is a schematic illustration of a gel fuel replacement cartridge with a circulation loop.

In yet another aspect of the invention, illustrated in FIG. 6E, the fuel vapor circulates between the gel fuel 680, which is disposed in a cartridge 692 and fuel cell system 682. In this illustrative embodiment a vapor delivery conduit 684, which carries fuel vapor from the gel fuel to the fuel cell system is provided. A vapor return conduit 686 returns unreacted vapor from the fuel cell system to the gel where additional fuel vapor is picked up from the gel fuel 680. Optional vapor management device 690, such as a fan or blower may be incorporated to encourage this circulation. Those skilled in the art will recognize that there are other means by which circulation may be accomplished.

EXAMPLES

A fuel cell test of a direct methanol fuel cell fed with methanol vapor from the methanol gel of the present invention being delivered to the cell anode, with passive air or air-breathing at the cell cathode was carried out in an environmental chamber set at 26° C. and 30% relative humidity. The test cell fixture had an active electrode area of 5 cm$^2$. The membrane electrode assembly ("MEA") consisted of a polymer electrolyte membrane, a proton form NAFION® membrane, coated with an anode catalyst layer containing 4 mg/cm$^2$ Platinum/Ruthenium (PtRu) on one side and with a cathode catalyst layer containing 4 mg/cm$^2$ Pt on the other side. Two identical backing layers, made from carbon cloth coated with a microporous layer of carbon and TEFLON® mixture, were laminated on to the catalyst coated membrane ("CCM") on each side to form the MEA. In the final cell assembly, the MEA was sandwiched between two flow fields made from corrugated and perforated 5 mil thick 316L stainless steel sheet. Silicone gaskets were used on each side of the membrane to achieve an adequate seal when the cell electrode was compressed with a SS316L faceplate tightened to the cell body with four 4/40 screws at 40 in-ounce torque. Air-breathing occurred with the ambient air passing through the opening of the face plate, the corrugated and perforated cathode flow field and cathode backing layer and the air thus reached the cathode catalyst layer attached to the polymer electrolyte membrane. At the anode, an anode chamber was formed by the internal space of the cell body and the MEA. During the fuel cell test, a fuel cartridge containing the inventive methanol gel fuel was placed inside the anode chamber. The anode chamber was then sealed with a lid to the cell body. There was a small hole in the lid to ventilate the $CO_2$ generated from the anode reaction of methanol electrooxidation to the environment when the $CO_2$ pressure inside the anode chamber became greater the ambient pressure. Tests have shown that a slight $CO_2$ pressure build-up (up to 10 psig) over the ambient pressure has minimum effects on the DMFC performance. An adequate pressure built-up by the $CO_2$ within the anode chamber indicates a good seal of the anode chamber, and prevents the access of air to the cell anode. The fuel cell performance tests were carried out with a test protocol consisting of following cycles:

1. After discharged at 0.3 V for 30 min, the cell was brought to OCV and held for 10 sec and applied current interrupt cell resistance check for 1 mS at a cell current of 0.3 Amp;
2. Once for every 2 hours during the test, the cell voltage was scanned from 0.3 to 0.18 V and then from 0.18 V to OCV at 1 mV/s to obtain the VI curves;
3. At the end of test, mass balance of cell was performed, and together with the amount of charge discharged, the energy conversion efficiency and water balance was determined.

Example 1

Figure 7A:
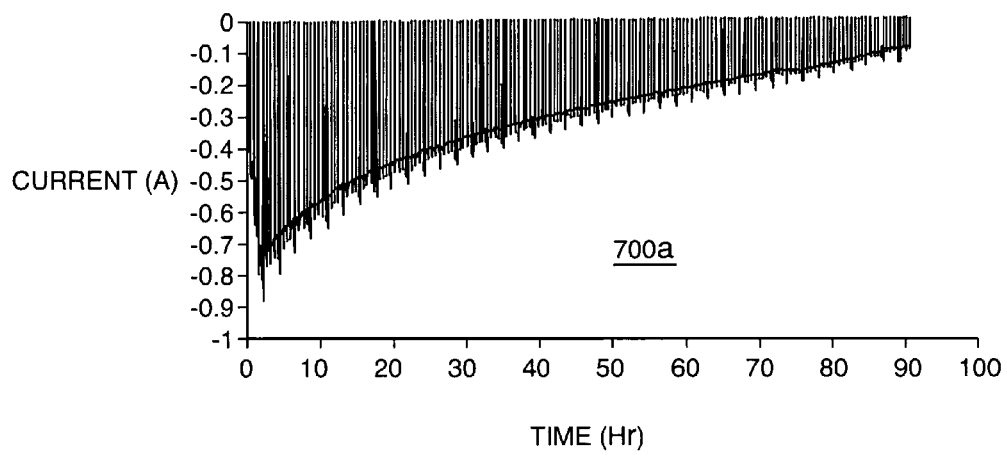
FIG. 7A is a graph illustrating cell discharge current over time.
Figure 7B:
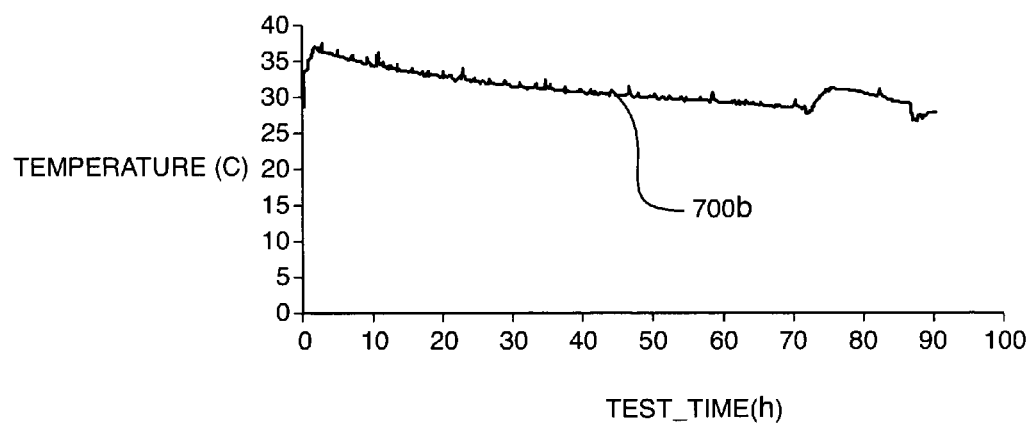
FIG. 7B is a graph illustrating cell temperature recorded over time for the first example of the invention.

The first test was conducted using the FVPL that is selective. Cell 3993 was prepared with an MEA using Nafion 1135 membrane as the polymer electrolyte. At the start of the test, a sample cup with a 5 cm$^2$ opening area and 2 cm deep was filled with 7.4263 gram of a methanol gel. The gel composition was 1.66 wt. % Carbopol®, 0.04 wt. % NaOH and 98.3% methanol. The opening of the sample cup containing the ethanol gel was then covered with a piece of silicone membrane of 15 μm thick supported with a PVDF substrate. The sample cup thus prepared was used as the fuel cartridge placed inside the cell anode compartment at the start of test. FIG. 7A is a plot 700*a* of the cell current during the test run of 90.6 hs. FIG. 7B shows a curve 700*b* of the cell temperature recorded at the cell cathode faceplate.

Figure 7C:
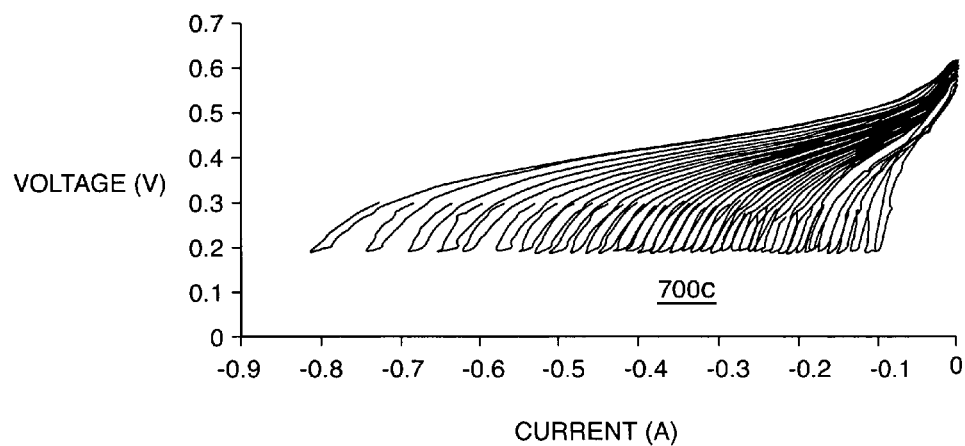
FIG. 7C shows VI curves recorded during the example test.
Figure 7D:
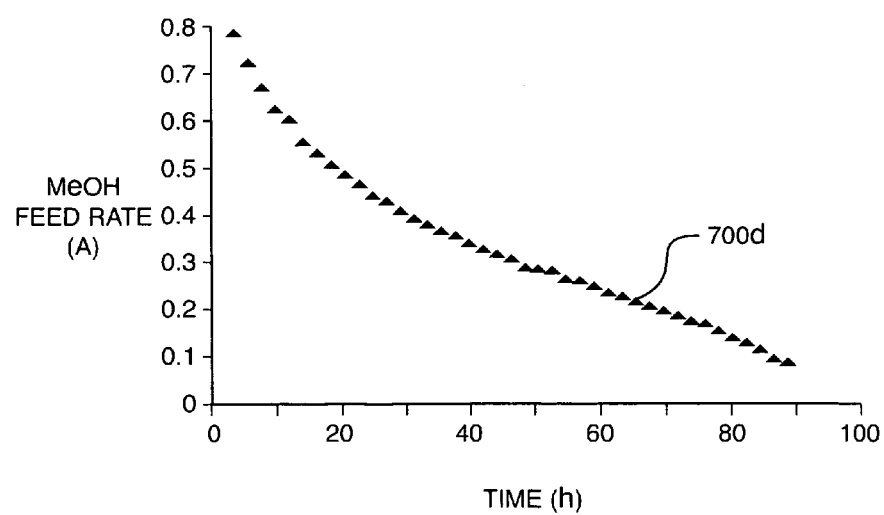
FIG. 7D is a graph of methanol feed rate over time in accordance with the first example.

The decrease in cell current during the run as shown in FIG. 7A was caused by a decrease in methanol feed rate from the gel during the run, as indicated by the decrease in the cell temperature in FIG. 7B. For a given cell energy conversion efficiency, in this case of 21.9%, the waste heat production, and therefore the rise of cell temperature above that of ambient, is proportional to the fuel feed rate. The fuel feed rate was also recorded as the limiting cell current when the cell voltage was scanned to 0.18 V at a two hours interval. As shown in FIG. 7C, the VI curves (collectively indicated by the reference character 700*c*) recorded during the run clearly indicate the limitation of fuel feed rate at 0.18 V by the downward curvature of plot 700*c* of the cell current as a function of the cell voltage. FIG. 7D is a graph 700*d* showing the fuel feed rate during the run as recorded by the cell limiting current at 0.18 V.

Figure 7E:
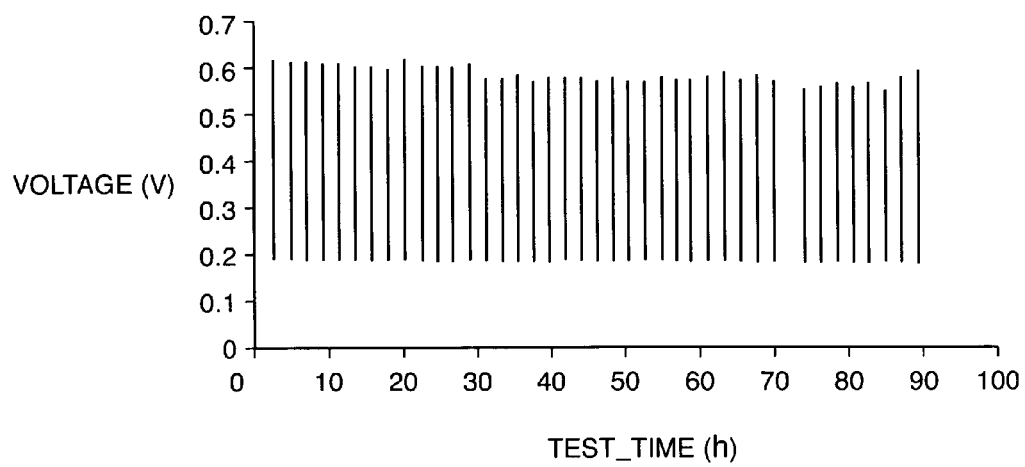
FIG. 7E is a bar graph of open circuit voltage recorded at the end of a cell voltage scan for the first example.

The open circuit voltage ("OCV") recorded during the cell voltage scan from 0.18 V to OCV at a scan rate of 1 mV/s is shown in FIG. 7E. The high OCV value indicates a good and stable cell cathode performance.

Figure 7F:
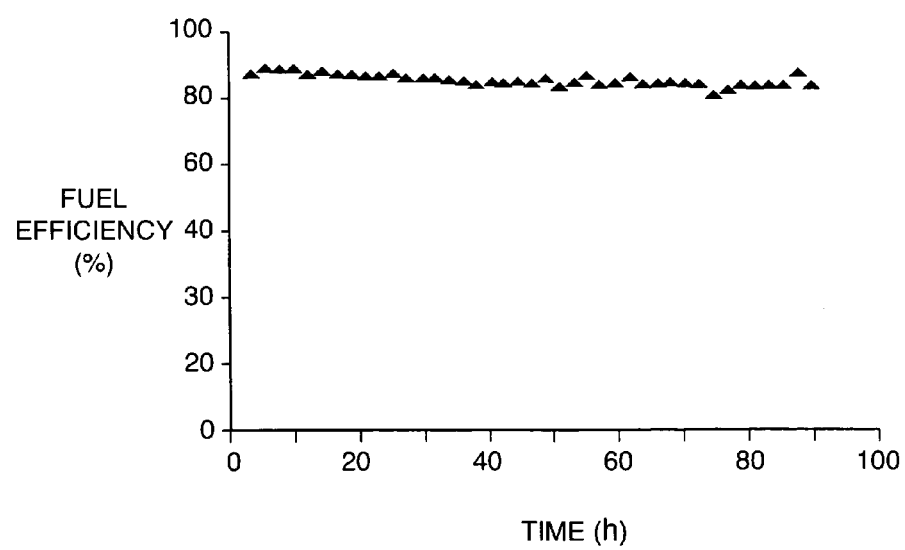
FIG. 7F is an illustration of fuel efficiency recorded over time for the first example.

The cell fuel efficiency at a given time during the run can be obtained by the ratio of the cell current at 0.3 V over the cell limiting current measured at a cell voltage of 0.18 V. As shown in FIG. 7F, a nearly constant fuel efficiency of 89.3% during the run was obtained. With a cell voltage of 0.3 V, the cell efficiency corresponds to a fuel cell energy conversion efficiency of 21.9%.

At the end of test, the masses of cell and fuel cartridge containing the methanol gel were measured. Methanol balance and water balance were determined based on the mass changes from the starting values, as listed in Table 1.

TABLE 1

| Mass balance of fuel cell test for cell 3993 for Example 1 using the selective FVPL. | |
|---|---|
| Methanol in gel | 98.4 wt. % |
| Gel mass at start (g) | 7.4263 |
| Gel mass at end (g) | 1.8292 |
| Run time (h) | 90.62 |

TABLE 1-continued

Mass balance of fuel cell test for cell 3993 for Example 1 using the selective FVPL.

| | |
|---|---|
| Discharge energy (Wh) | 8.3276 |
| Energy conversion in Wh/cc of methanol | 1.07 |
| Fuel efficiency | 89.34% |
| Cell resistance (Ohms cm$^2$) | 0.357 |
| Average rate of water Generation (mg/g cm$^2$) | 15.3 |
| Average rate of water removal at cathode (mg/g cm$^2$) | 14.3 |

Example 2

Figure 8:
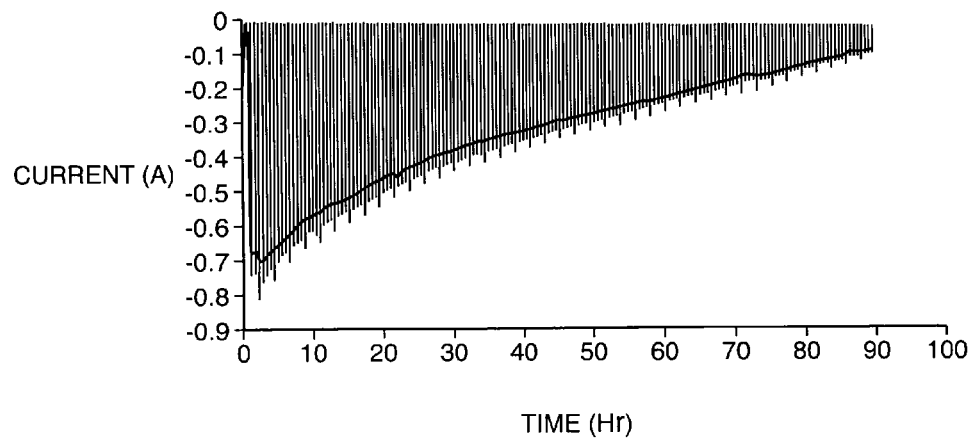
FIG. 8 is a graph of cell discharge current recorded over time for a second example.

The next example was of a system in which the porous FVPL was used. Cell 3994 was prepared similarly as cell 3993 in Example 1, except that a different membrane was used to seal the methanol gel placed inside the sample cup. At the start of the test, a sample cup with a 5 cm$^2$ opening area and 2 cm deep was filled with 7.3025 grams of a methanol gel. The gel composition was 1.66 wt. % Carbopol®, 0.04 wt. % NaOH and 98.3% methanol. The opening of the sample cup containing the methanol gel was then covered with a piece of Zitex A135 expanded poly tetraflouroetylene ("EPTFE") membrane (available commercially from Norton Performance Plastics, of Wayne, N.J., USA). The A135 membrane is 5 um thick, and has a maximum functional pore size of 20-30 ums and approximate pore volume of 65%. The sample cup thus prepared was used as the fuel cartridge placed inside the cell anode compartment at the start of test. FIG. 8 shows cell discharge current 600 recorded during the test run for the cell.

At the end of test, the masses of cell and fuel cartridge containing the methanol gel were measured. Methanol balance and water balance were determined based on the mass changes from the starting values, as listed in Table 2.

TABLE 2

Mass balance of fuel cell test for cell 3994 using a porous FVPL.

| | |
|---|---|
| Methanol in gel | 98.4 wt. % |
| Gel mass at start (g) | 7.3025 |
| Gel mass at end (g) | 1.8223 |
| Run time (h) | 90.62 |
| Discharge energy (Wh) | 8.3024 |
| Energy conversion in Wh/cc of methanol | 1.06 |
| Fuel efficiency | 89.30% |
| Cell resistance (Ohms cm$^2$) | 0.335 |
| Average rate of water generation (mg/g cm$^2$) | 15.4 |
| Average rate of water removal at cathode (mg/g cm$^2$) | 13.9 |

Example 3

Cells 4011 and 4012 were prepared identically as cell 3994 described in Example 2. At the end of test, the masses of cell and fuel cartridge containing the methanol gel were measured. Methanol balance and water balance were determined based on the mass changes from the starting values, as listed in Table 3.

TABLE 3

Mass balance of fuel cell test for cells 4011 and 4012

| | Cell 4011 | Cell 4012 |
|---|---|---|
| Methanol in gel | 98.4 wt. % | 98.4 wt. % |
| Gel mass at start (g) | 7.7648 | 7.3839 |
| Gel mass at end (g) | 2.1478 | 2.0075 |
| Run time (h) | 88.68 | 88.64 |
| Discharge energy (Wh) | 9.5374 | 8.7547 |
| Energy conversion in Wh/cc of methanol | 1.13 | 1.13 |
| Fuel efficiency | 88.86% | 92.54% |
| Cell resistance (Ohms cm$^2$) | 0.287 | 0.357 |
| Average rate of water generation (mg/g cm$^2$) | 16.9 | 15.6 |
| Average rate of water removal at cathode (mg/g cm$^2$) | 14.3 | 13.7 |

Example 4

Figure 9A:
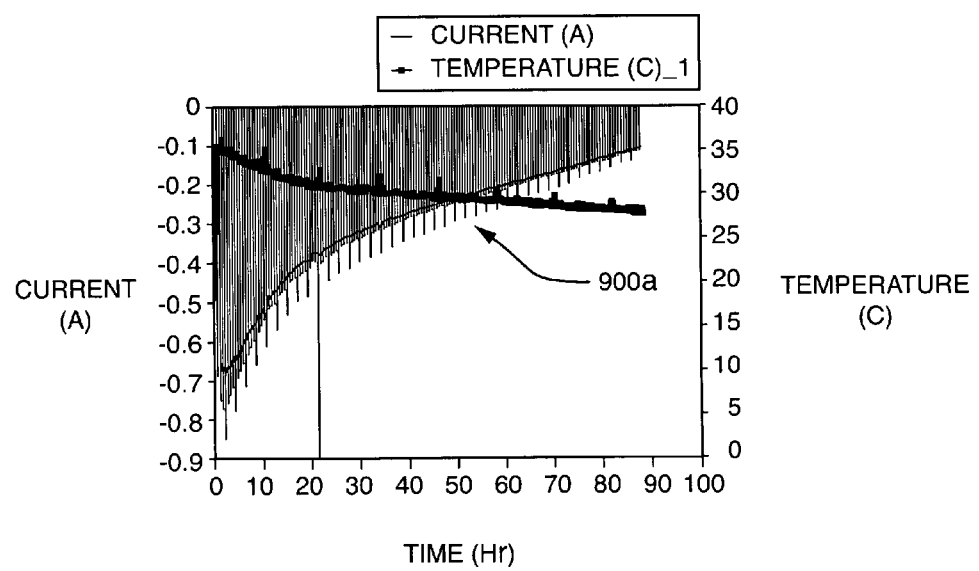
FIG. 9A is a graph of cell discharge current and cell temperature over time recording during a fourth test of the fuel cell in accordance with the present invention.
Figure 9B:
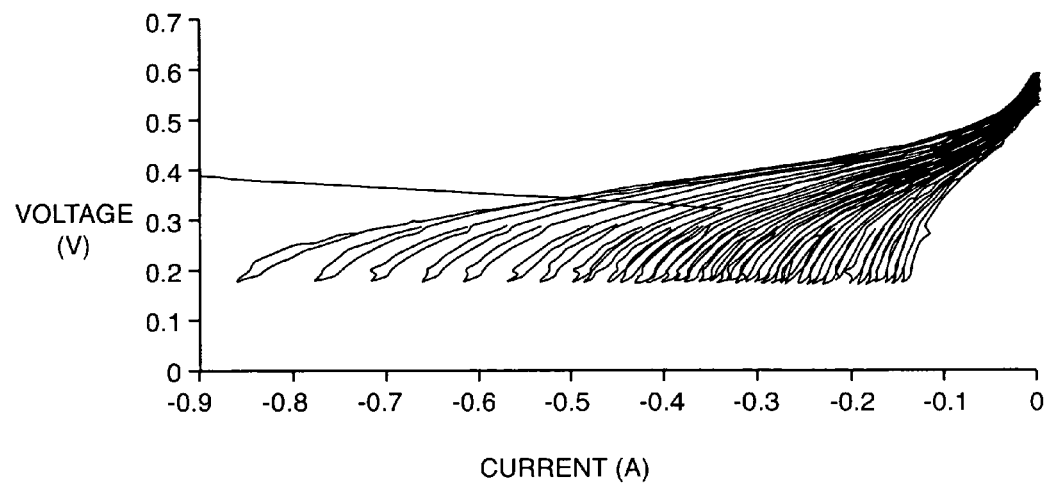
FIG. 9B are the VI curves for the second example of the present invention.
Figure 9C:
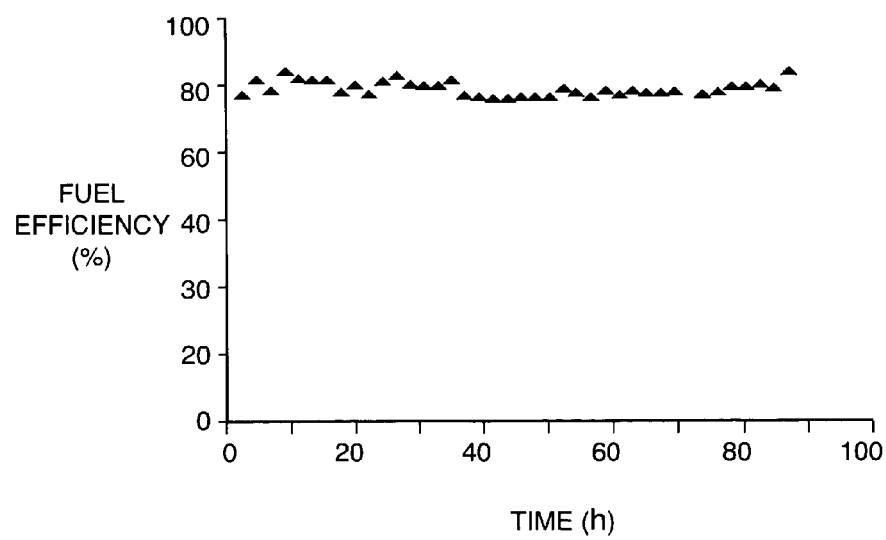
FIG. 9C is fuel cell efficiency calculated by the ratio of current over the limiting current for the fourth example of the invention.

Cell 4035 was prepared similarly as cell 3993 described in Example 1, except that the polymer electrolyte membrane used was a Nafion 112 membrane. At the start of the test, a sample cup with a 5 cm$^2$ opening area and 2 cm deep was filled with 7.7920 grams of a methanol gel. The gel composition was 1.66 wt. % Carbopol®, 0.04 wt. % NaOH and 98.3% methanol. The opening of the sample cup containing the methanol gel was then covered with a piece of silicone membrane of 15 um thick supported with a PVDF substrate. The sample cup thus prepared was used as the fuel cartridge placed inside the cell anode compartment at the start of test. FIG. 9A is a plot 900*a* of the cell current during the test run of 88.65 hs, and FIG. 9B shows the VI curves (900*b*) taken at two hour intervals during the run.

The cell fuel efficiency at a given time during the run can be obtained by the ratio of the cell current at 0.3 V over the cell limiting current measured at a cell voltage of 0.18 V. As shown in FIG. 7C, a nearly constant fuel efficiency of 83.1% during the run was obtained. With a cell voltage of 0.3 V, the cell efficiency corresponds to a fuel cell energy conversion efficiency of 21.0%. Comparing the fuel utilization efficiency shown for cell 3393 in FIG. 7F, the fuel utilization efficiency of cell 4036 is lower because of a thinner polymer electrolyte membrane was used.

At the end of test, the masses of cell and fuel cartridge containing the methanol gel were measured. Methanol balance and water balance were determined based on the mass changes from the starting values, as listed below in Table 4.

TABLE 4

Mass balance of fuel cell test for cells 4036

| | |
|---|---|
| Methanol in gel | 98.4 wt. % |
| Gel mass at start (g) | 7.7920 |
| Gel mass at end (g) | 2.2805 |
| Run time (h) | 88.65 |
| Discharge energy (Wh) | 8.0318 |
| Energy conversion in Wh/cc of methanol | 1.00 |
| Fuel efficiency | 83.12% |
| Cell resistance (Ohms cm$^2$) | 0.327 |
| Average rate of water generation (mg/g cm$^2$) | 16.1 |
| Average rate of water removal at cathode (mg/g cm$^2$) | 13.9 |

It should be understood that the methanol gel of the present invention is a highly stable substance that maintains its integrity and traps and contains the methanol within it improving safety features of the overall product by minimization of leaks, should there be a breach of containment, such as a crack or puncture in the cartridge walls. In this way, pumping valves and recirculations required with liquid products can be avoided in part and the methanol can be released in the vaporous form, which is desirable.

The foregoing description has been directed to specific embodiments of the invention. It will be apparent, however, that other variations and modifications may be made to the described embodiments with the attainment of some or all of the advantages of such. Therefore, it is the object of the appended claims to cover all such variations and modifications as come within the true spirit and scope of the invention.

What is claimed is:

1. A fuel for use in a fuel cell, comprising:
   (A) a carbonaceous fuel substance wherein said carbonaceous fuel substance is substantially comprised of neat methanol; and
   (B) a thickening substance that imparts viscosity to the fuel substance, thereby forming a gel fuel, wherein said thickening substance is substantially comprised of a hydrophobically modified cross-linked polyacrylate polymer rheology modifier.

2. The fuel as defined in claim 1, wherein said neat methanol comprises between about 90 to 100 per cent by weight of the total composition of the fuel substance.

3. The fuel as defined in claim 1, wherein said thickening substance comprises about 2 per cent by weight of the total composition of the fuel substance.

4. The fuel as defined in claim 1 in which the gel fuel has a viscosity of between about 1000 to 48,000 mPa s.

5. The fuel as defined in claim 1, further comprising safety enhancing additives.

6. The fuel as defined in claim 5 wherein said safety-enhancing additives are selected from the group consisting of colorants, bitters, and flame retardants.

7. The fuel as defined in claim 1, further comprising polymeric additives.

8. The fuel as defined in claim 1, further comprising an alkaline pH-modifying substance.

9. A fuel cartridge for use with a fuel cell, the cartridge comprising:
   (A) a compartment for holding a fuel suspended in a gel; and
   (B) a fuel vapor permeable layer "FVPL" forming one aspect of said compartment, said FVPL being permeable to a fuel substance that is released out of said gel, and said aspect of said compartment being coupled with said fuel cell in such a manner that the fuel travels through said FVPL into said fuel cell, wherein said FVPL is substantially comprised of a highly selective monolithic material having selectivity between fuel substance and water, such fuel substance can travel through said monolithic material to said fuel cell and water is substantially resisted from traveling from said fuel cell into said fuel cartridges.

10. The fuel cartridge as defined in claim 9 further comprising multiple FVPLs, at least one of which is said highly selective material.

11. A method of supplying fuel to a fuel cell, the method comprising the steps of:
    (A) providing a fuel substance suspended within a gel such that when contacting air, fuel is evaporated out of said gel;
    (B) directing said evaporated fuel substance into a fuel cell using a fuel vapor permeable layer "FVPL" coupled to a fuel cell which FVPL allows fuel substance to pass through it into said fuel cell;
    (C) providing as said fuel substance neat methanol;
    (D) mixing a thickening substance into said neat methanol;
    (E) adding a pH balancing substance to said neat methanol mixture to form a gel fuel;
    (F) placing said gel fuel in a cartridge that has at least one FVPL having a methanol permeable wall; and
    (G) attaching said cartridge to a fuel cell with said methanol permeable wall contiguous to an anode aspect of said fuel cell to thereby direct said evaporated fuel substance into the fuel cell.

12. The method as defined in claim 11 including the further step of reconstituting the gel fuel by adding additional liquid fuel.

13. A direct oxidation fuel cell system, comprising:
    (A) a direct oxidation fuel cell including:
        (i) a membrane electrolyte intimately interfacing with a catalyst layer along each of membrane's major surfaces, being a catalyzed membrane electrolyte, having an anode aspect and a cathode aspect;
        (ii) an effective water supply from cathode to anode within said fuel cell, so that water management in said fuel cell is achieved without water collection from the cathode and/or water transport from cathode to anode external to the active volume of the fuel cell;
    (B) a fuel supply cartridge having means for removably attaching said cartridge to said fuel cell, including:
        (i) a compartment for holding a fuel substance suspended in a gel; and
        (ii) a fuel vapor permeable layer "FVPL" forming one aspect of said compartment, said FVPL being permeable to the fuel substance that is released out of said gel, and said aspect of said compartment being coupled with said fuel cell in such a manner that the fuel travels through said FVPL into said fuel cell; and
    (C) an electrical coupling across said fuel cell for supplying power to an application device.

14. A fueling device for a fuel cell system, comprising:
    (A) an internal fuel compartment that contains a gel fuel coupled to at least one fuel cell in the fuel cell system for delivering a fuel substance that evaporates out of said gel fuel; and
    (B) a replacement container coupled to said internal fuel compartment for refueling the gel fuel in said compartment.

15. The fueling device as defined in claim 14 wherein said fuel cell system and said internal fuel compartment are disposed within an application device.

16. The fueling device as defined in claim 14 wherein said replacement container houses a gel fuel for replacing gel fuel in said internal fuel compartment.

17. The fueling device as defined in claim 14 wherein said replacement container houses a liquid fuel for delivery to said internal fuel compartment to reconstitute the gel fuel that supplies said fuel cell system.

18. A fuel cartridge for use with a fuel cell, the cartridge comprising:
    (A) means for removably attaching the cartridge from an associated fuel cell;
    (B) a compartment for holding a fuel suspended in a gel; and (C) a fuel vapor permeable layer "FVPL" forming one aspect of said compartment, said FVPL being permeable to a fuel substance that is released out of said gel, and said aspect of said compartment being coupled with said fuel cell in such a manner that the fuel travels through said FVPL into said fuel cell.

* * * * *